(12) United States Patent
Almog et al.

(10) Patent No.: US 7,542,476 B2
(45) Date of Patent: Jun. 2, 2009

(54) METHOD AND SYSTEM FOR MANIPULATING IP PACKETS IN VIRTUAL PRIVATE NETWORKS

(75) Inventors: Guy Almog, Herzelia (IL); Eitan Bar, Tel-Aviv (IL)

(73) Assignee: Flash Networks Ltd, Herzliya (IL)

( * ) Notice: Subject to any disclaimer, the term of this patent is extended or adjusted under 35 U.S.C. 154(b) by 937 days.

(21) Appl. No.: 10/928,836

(22) Filed: Aug. 27, 2004

(65) Prior Publication Data

US 2005/0047329 A1 Mar. 3, 2005

Related U.S. Application Data

(60) Provisional application No. 60/499,236, filed on Aug. 29, 2003.

(51) Int. Cl.
*H04L 12/26* (2006.01)
(52) U.S. Cl. .................................. 370/401; 370/465
(58) Field of Classification Search ................ 370/351, 370/389, 392, 400–404, 419, 420, 464–467
See application file for complete search history.

(56) References Cited

U.S. PATENT DOCUMENTS

| | | | |
|---|---|---|---|
| 6,163,779 A | 12/2000 | Mantha et al. | |
| 6,192,382 B1 | 2/2001 | Lafer et al. | |
| 6,249,844 B1 | 6/2001 | Schloss et al. | |
| 6,356,931 B2 | 3/2002 | Ismael et al. | |
| 6,438,100 B1 * | 8/2002 | Halpern et al. | 370/401 |
| 6,493,717 B1 | 12/2002 | Junkin | |
| 6,532,088 B1 * | 3/2003 | Dantu et al. | 370/223 |
| 6,585,777 B1 | 7/2003 | Ramaley et al. | |
| 6,589,291 B1 | 7/2003 | Boag et al. | |
| 6,704,024 B2 | 3/2004 | Robotham et al. | |
| 6,738,803 B1 | 5/2004 | Dodrill et al. | |
| 6,779,154 B1 | 8/2004 | Nussbaum et al. | |
| 6,792,575 B1 | 9/2004 | Samaniego et al. | |
| 6,865,593 B1 | 5/2005 | Reshef et al. | |
| 6,912,691 B1 | 6/2005 | Dodrill et al. | |
| 7,292,581 B2 * | 11/2007 | Finn | 370/395.53 |
| 2001/0044842 A1 * | 11/2001 | Kawakami | 709/223 |
| 2003/0051055 A1 | 3/2003 | Parrella, Sr. et al. | |
| 2003/0112808 A1 * | 6/2003 | Solomon | 370/400 |
| 2005/0237955 A1 * | 10/2005 | Shapira et al. | 370/299 |

* cited by examiner

*Primary Examiner*—Aung S Moe
*Assistant Examiner*—Kerri M Rose
(74) *Attorney, Agent, or Firm*—Gregory Scott Smith; Smith Frohwein Temple Greenlee Blaha, LLC

(57) ABSTRACT

VPN tunnels are used to connect remote equipment to corporate intranets to create private connections over an ordinarily public network. Problems arise when multiple VPNs are being managed and when the connections exist of specific network segments, such as but not limited to wireless, satellite, cellular, and fiber optics. The disclosed invention allows the VPN tunnel to be broken and a Manipulated VPN to be established in the break. The Manipulated VPN allows for an improvement in efficiency in that manipulation equipment located at each side of the VPN break can emulate the destination equipment and thus, speed the data transfer. To accommodate the use of private IP addresses in this environment, bits of the time to live field are utilized to represent the particular VPN in which a destination private IP address resides.

25 Claims, 9 Drawing Sheets

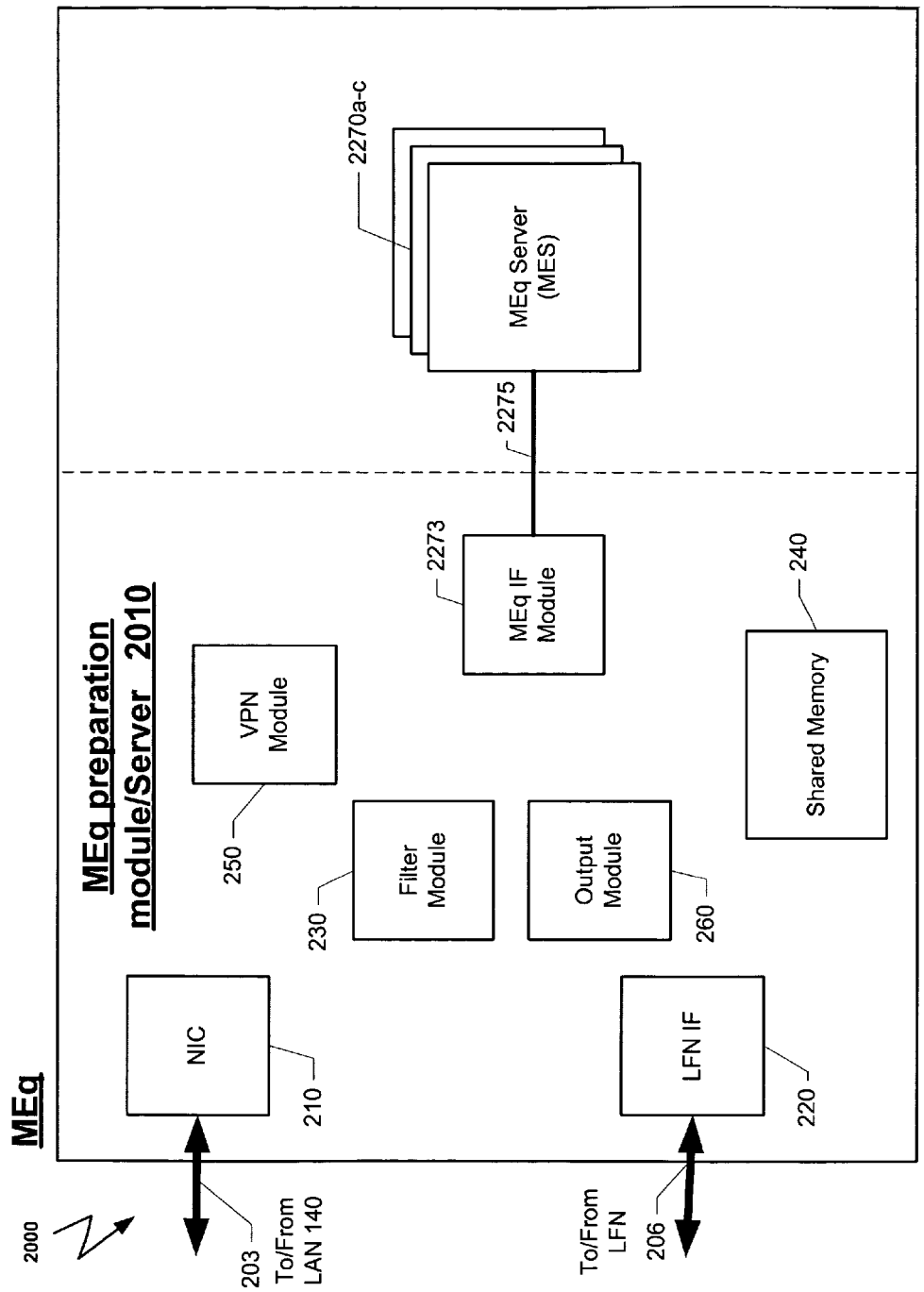

METHOD AND SYSTEM FOR MANIPULATING IP PACKETS IN VIRTUAL PRIVATE NETWORKS

CROSS-REFERENCE TO RELATED APPLICATIONS

This patent application claims the benefit of the filing date of United States provisional application for patent having Ser. No. 60/499,236 and having been filed on Aug. 29, 2003.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISK APPENDIX

Not applicable.

BACKGROUND OF THE INVENTION

The present invention relates to the field of data communications and more specifically, to a system and method for connecting Manipulation Equipment or manipulators (MEq) on both sides of a specific network segment such as a Large Bandwidth Delay Product, or "Long Fat Network" (LFN), that supports Enterprise Virtual Private Networks (VPN).

Conventionally, companies have networked geographically dispersed intra-corporation networks together through the use of private lines. This technique allowed for the formation of a network system that was isolated from external networks and therefore, there was some level of assurance that the private network would be secure. However, when intra-corporation communication is conducted over the Internet, thereby taking advantage of the low cost associated with such connectivity, enterprise communication is performed through the use of a Virtual Private Network (VPN). A VPN involves building a virtual private network through the use of a public network such as the Internet by utilizing the Internet Protocol (IP) facilities provided by IP networks as well as lower layer protocols. This results in a private network that is isolated from external networks and also provides quality assurance service of any level, even through the Internet.

A VPN tunnel may extend over a combination of physical networks along the connection. For example, a VPN connection may originate over a terrestrial connection such as the PSTN (Public Switched Telephone Network) and continue through a satellite communication link and/or cellular link and then terminate at a corporate Intranet over an ISDN (Integrated Services Digital Network) line. The VPN may spread over wire line networks and wireless data networks and may run over a specific network segment such as a Large Bandwidth Delay Product (i.e. a "Long Fat Network" (LFN)). A VPN may use a combination of data packets and radio protocols on the wireless side and tunneling protocols on the plane side (fix side, static side). Other VPNs may use the same tunneling protocol along the wireless section as well as the plane side of the VPN. The VPN may be based on a variety of protocols. These protocols include but are not limited to L2TP, GRE, IEEE 802.1Q (VLAN Tagging or VLAN TAG—both terms are used interchangeably herein), and IP-over-IP protocols.

In intra-corporate networks, private IP addresses are often used. IP addresses are divided into public IP addresses and private IP addresses. Public IP addresses are globally defined unique addresses, whereas private IP addresses can be freely defined by a corporation as long as the IP address is compatible with the standard. Thus, it is desirable for private IP addresses to be used when corporations use a VPN service. If multiple VPNs are established simultaneously via an operator's network and private IP addresses are used over the VPNs, it's possible that a private IP address used in one VPN may also be used at the same time in another VPN over the operator network. In addition, a particular VPN connection may carry more than one connection between multiple remote peers to multiple destinations in the corporation's Intranet.

On some occasions, the VPN connection may run over a specific network segment such as a long delay connection or long fat network (LFN) such as a satellite link, fiber cable services, wireless, cellular, etc. It should be noted that the terms: specific network segment; "LFN"; satellite link; fiber cable services; other terrestrial connections; wireless; and cellular are used interchangeably herein. Henceforth, the description of the present invention may use the term 'LFN' as a representative term for any of the above group. In order to improve service, a service provider or operator may want to add Manipulation Equipment (MEq) at both a remote operator's zone and a central operator zone. The MEq accelerates the transportation of data over the long delay connection. Common MEq components may operate and manipulate common IP products such as TCP/IP; UDP/IP, etc. However, common MEq components may not manipulate data that constitute encapsulated VPN packets.

The MEq interrupts the communication between a remote client and its final destination over a VPN and then manipulates the data before transmitting the data over the LFN. On the other side of the LFN, a second MEq is installed in order to perform the inverse operation of the first MEq. By doing this, the MEq improves the speed of communication and reduces the volume of data over the LFN lines. Alternately, an MEq may emulate the other side of the connection by impersonating and responding in the name of the other side of the connection. This aspect of the present invention operates to increase the speed of the communication. For example, if an original connection is based on TCP/IP, then the MEq may respond to the requesting device by sending an acknowledge packet directly to the device rather than waiting for the other side of the connection to generate an acknowledge packet. An MEq may manipulate data in the internal layers such as the Transport layer (i.e. TCP) and the Application layer (HTTP, MAPI etc.) as well as actual content (html, gif etc.). Within the context of this description, the terms manipulation, optimization and acceleration are used interchangeably.

Therefore, there is a need to break the VPN tunnels at the input to the MEq and reconstruct (re-tunnel) the VPN tunnels at the output of the MEq. Moreover, the communication between a remote operator's zone (ROZ) and the central operator's premises (COP) may be comprised of multiple VPN tunnels originating from multiple peers that may belong to different corporations that are currently located within the same remote zone, as well as private users that may use the same operator services. Some of those may use the MEq while others may not. Furthermore, the communication to and from a client using the MEq may contain information that is not handled by the MEq. In addition, at the central operator's premises the communication may come from ROZs to multiple corporations via the Internet.

Therefore MEqs, which are located on both sides of an LFN, face several obstacles. For instance, the MEq may be required to first break multiple VPN channels between different peers and different corporations that are currently connected over the LFN between the ROZs and the COP. The MEq may then be required to manipulate the original packet, which is encapsulated in the VPN packet as the payload. Finally, the MEq may need to reconstruct the VPN packet with the manipulated data as the payload packet of the VPN packet and then send it to the appropriate destination via the MEq on the other side of the LFN. On the other side of the LFN a complementary MEq server performs, as needed, the inverse manipulations and then reconstructs the VPN tunnel.

Therefore, there is a need for a system and method for breaking multiple VPN tunnels that lie between ROZs, COPs, and multiple corporate intranets over a data network (such as the Internet or private connection), redirecting the data to a manipulation server, manipulating the data, receiving the manipulated data, and finally reconstructing (restoring) the appropriate VPN tunnels (re-tunneling) again.

BRIEF SUMMARY OF THE INVENTION

The present invention solves the above-described needs by providing manipulation equipment on both sides of a long fat network (LFN) in order to break the VPN tunnel, manipulate the payload, and transfer the manipulated payload over the long fat network to the other manipulation equipment. The other manipulation equipment then reconstructs the VPN tunnel and sends the reconstructed VPN packet to its destination.

Furthermore, information regarding the VPN tunnel is transferred between the manipulation equipment in one of the fields of the IP header of the packets that carries the manipulated payload over the long fat network. For example, the information may be embedded in the Time to Live (TTL) field in the IP header of the packet.

Other objects, features, and advantages of the present invention will become apparent upon reading the following detailed description of the embodiments with the accompanying drawings and appended claims.

BRIEF DESCRIPTION OF THE DRAWINGS

FIG. 2b is a block diagram of an alternate exemplary embodiment of MEq that may be used in a Remote Operator Zone.

DETAILED DESCRIPTION OF THE INVENTION

Turning now to the figures in which like numerals represent like elements throughout the several views, exemplary embodiments of the present invention are described. For convenience, only some elements of the same group may be labeled with numerals. The purpose of the drawings is to describe exemplary embodiments and not for production. Therefore features shown in the figures are chosen for convenience and clarity of presentation only.

Figure 1:
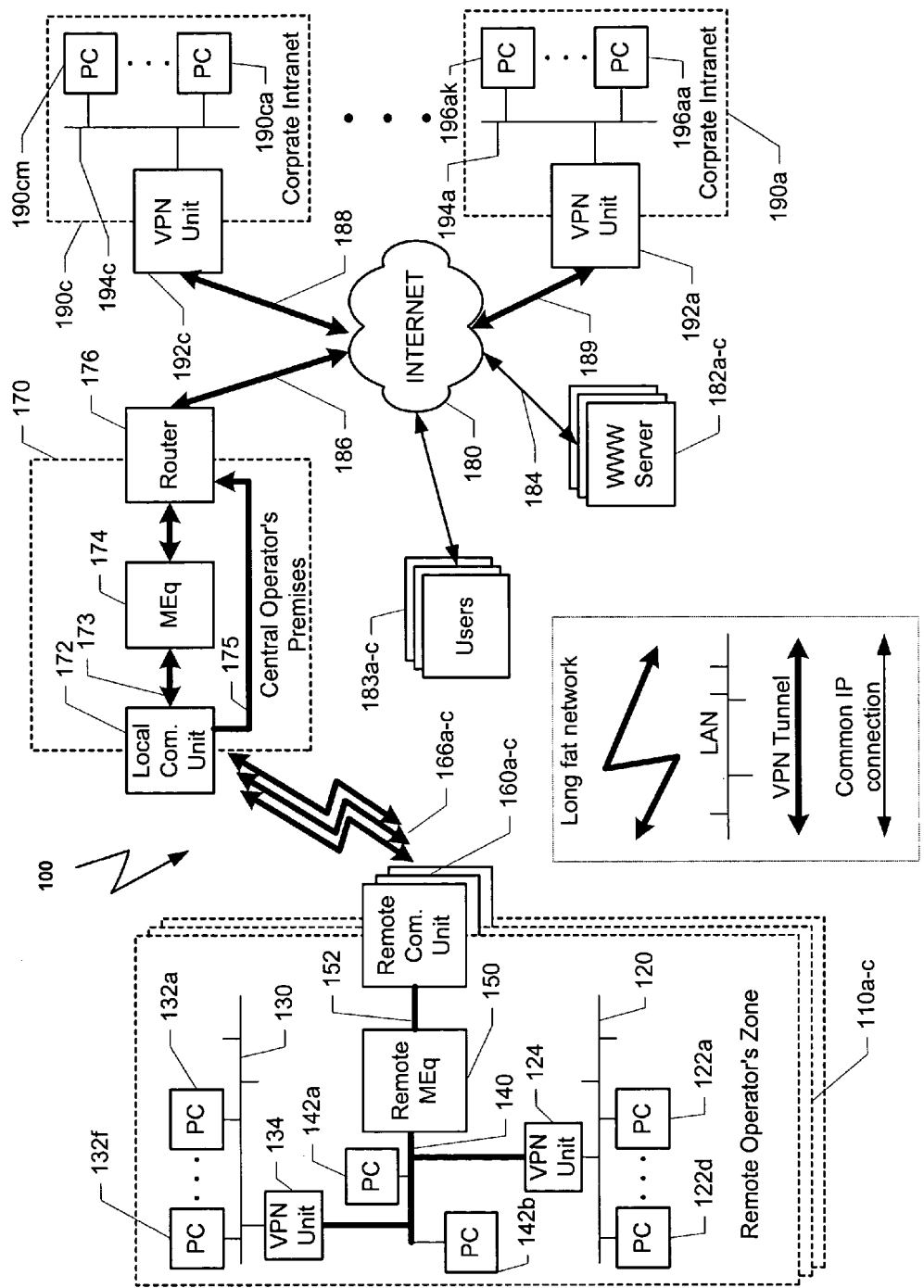
FIG. 1 is a block diagram of an exemplary communication system that implements an exemplary embodiment of the present invention.

FIG. 1 is a block diagram of an exemplary communication system 100 that implements an exemplary embodiment of the present invention. System 100 may be comprised of multiple ROZs 110a-c. ROZs 110a-c may be at different locations around the world. Each one of the ROZs may be connected over a LFN link 166a-c through the COP 170. The LFN 166a-c may be a satellite connection, a wireless link, fiber optic cable, etc. On the other side, the COP 170 may communicate with multiple private networks and Intranets 194a-c that belong to multiple corporations 190a-c, multiple web servers 182a-c and multiple private Internet users 183a-c. The communication between the COP 170 and corporate intranets 190a-c, web servers 182a-c and private Internet users 183a-c is via a global network, such as the Internet 180. It will be appreciated by those skilled in the art that depending upon its configuration and needs, the COP 170 may service many more than three ROZs 110a-c, as well as more than three Intranets 190a-c and more than three web servers 182a-c or users 183a-c. However, for purposes of simplicity of understanding, three units of each are shown.

A remote operator zone, ROZ 110a-c, may be comprised of multiple peers 132a-f and 122a-d. Each group may belong to or be associated with a corporation and be a member of a corporate intranet 190a-c. Each group of those remote peers may communicate among themselves over a local network, such as LAN 120 or WAN 130. Any number of remote peers 132a-f and 122a-d may be connected over a LAN 120 or WAN 130. By way of example, FIG. 1 illustrates the use of two LANs in a ROZ. However, those skilled in the art will realize that any number of LANs/WANs could be used in this system, and each LAN/WAN may serve any number of peers. Each LAN/WAN 130, 120 is connected to an ROZ's LAN/WAN 140 through a VPN unit 134, 124 respectively. Multiple users 142a-b may be connected directly over the ROZ's LAN/WAN 140. Those users may be private users that are served by the same operators and may not belong to any one of the corporate intranets 190a-c.

A VPN unit 134, 124 may be an access router for site-to-site VPNs. A VPN unit 134, 124 may also deliver routing, firewall protection, dialing capabilities, Packet Voice Gateway support and VPN functions for multi-service VPN applications. The VPN applications may be based on tunneling protocols including but not limited to Generic Routing Encapsulation (GRE), L2TP, IEEE 802.1Q (VLAN Tagging, or VLAN TAG, both terms are used interchangeably herein), and IP-over-IP protocols. Examples of VPN units include the Cisco 2600 or similar units manufactured by companies such as Juniper Networks, Nortel, Foundry, Avaya, and Lucent.

The ROZ's LAN/WAN 140 may carry common IP (Internet Protocol) packets as well as VPN tunneling packets. In FIG. 1 the communication lines that may carry VPN tunneling packets are marked by thick lines (140, 152, 166a-c 186, 188 & 189).

The transportation of data from the ROZ's LAN/WAN network 140 may be transferred through the remote MEq unit 150 to the remote communication unit 160. The remote MEq unit 150 interrupts the communication between the ROZ's LAN/WAN network 140 and the remote communication unit 160 and then manipulates the data. An example of the manipulation of data process is where an MEq personalization server operates to add or remove banners directed towards the remote client. Other MEq units may operate to improve the speed of the communication and reduce the volume of data over the LFN links. An MEq may manipulate data at the internal layers including the Transport layer (TCP) and Application layer (HTTP, MAPI etc.) as well as content (html, gif etc.). In the case where the transportation of data takes place over a VPN tunnel, the MEq 150 breaks the tunnel, manipulates the original data packet that is encapsulated in the tunnel packet, and then reconstructs the tunnel before sending the manipulated data packet to the other side of the communication link.

In one exemplary embodiment, the MEq 150 may be configured as the default gateway for both sides (i.e., for all the units that are connected to the LAN 140 and for the remote communication unit 160*a-c*). In another exemplary embodiment, the MEq 150 may physically reside between the WAN/LAN 140 and the remote communication unit 160*a-c*. In those cases the operation of the MEq 150 may be transparent to both sides—the ROZ's LAN/WAN 140 as well as the remote communication unit 160.

The operation of the remote MEq 150 is disclosed in more detail below in conjunction with the discussion of FIGS. 3, 4*a*, 5, 6, and 7.

The remote communication unit 160*a-c* is an access gateway, which converts the traffic coming through the MEq 150 into an appropriate protocol that fits the requirement of the LFN 166*a-c* and vice-versa. In the case of satellite communication, the remote communication unit 160*a-c* may include the satellite dish. The remote communication unit 160*a-c* may act as an Authentication, Authorization, and Accounting (AAA) a gent for the remote client. The remote communication unit 160*a-c* may also act as a Remote Access Server (RAS) or any other similar node. Remote communication units 160*a-c* may be manufactured by companies such as, but not limited to, Gilat Satellite, Shin Satellite, etc.

The transportation of data between the ROZ 110*a-c* and the COP 170 is performed over the LFN 166*a-c*. At the COP 170 the connection is terminated at a local communication unit 172. The local communication unit 172 may perform a similar function as the remote communication unit 160*a-c* with additional functionality in that it may communicate with multiple LFNs 166*a-c* coming from multiple ROZs 110*a-c*. Local communication unit 172 may be manufactured by companies such as, but not limited to, Gilat Satellite, Shin Satellite, etc.

The MEq 174 may perform similar functions as that of the remote MEq 150. The MEq 174 may operate to receive all the transportation that is transferred between the local communication unit 172 and the router 176. The MEq 174 cooperates with each of the remote MEqs 150 that are located in the different ROZs 110*a-c*. In cases where the manipulated data is transferred over manipulation tunnels, the manipulation tunnels are in between the two manipulation units Remote MEq 150 and MEq 174. If Remote MEq 150 emulates the corporate side of the connection while communicating with the remote client, then MEq 174 emulates the remote user while communicating with the appropriate corporate intranet. The operation of the MEq 174 is disclosed in more detail below in conjunction with the discussion of FIGS. 3, 4*b*, 5, 6, and 7.

Router 176 may be a common third Layer Switch or some other type of router that routes data over the Internet 180. Routers may be manufactured by companies such as but not limited to Cisco, Juniper, Nortel, Foundry, Avaya and Lucent. From the router 176 the data continues through the Internet 180 to it's final destination. In the case where the final destination is one of the corporate intranets 190*a-c*, the communication continues through the appropriate VPN unit 192*a-c* that performs the complementary functionality of VPN units 134, 124. VPN units 192*a-c* may be the same units as VPN 134, 124. VPN unit 192*a-c* terminates the VPN tunnel and transfers the payload packet to its destination in the corporate intranet 194*a-c*. Common IP packets that are aimed to one of the web servers 182*a-c* or one of the private users 183*a-c* are transferred over a common IP connection through the Internet 180 to their destination. In the other direction, the information coming from a corporate intranet 190*a-c* or a web server 182*a-c* to a remote peer transfers data over the same path but in the other direction.

In the exemplary system 100, packets that carry the same relevant data may have different addresses along different segments of the communication path from a remote user to it's destination on the other side of the Internet 180. For example, a TCP/IP data packet that may be transferred from a remote peer 132*a* to its corporate intranet 190*a* and then to user 196*ak* may have the following source and destination addresses along its path. Over remote LAN 130 the source address is the private IP address of the remote peer 132*a*, and the destination address is the private IP address of 196*ak*. Over LAN 140 the original packet is encapsulated in a VPN packet as the payload packet of the VPN packet. The encapsulation is performed by VPN unit 134. The VPN packet has the source address of VPN unit 134, and the destination address is the IP address of VPN unit 192*a* of corporate intranet 194*a*. The payload of the VPN packet is the original packet having the same IP addresses as the original packet (132*a*; 196*ak* respectively).

The following illustrates an exemplary embodiment of the p resent invention where the load is reduced on the MEq 174 at the COP 170. The large load, which is due to heavy traffic in the COP 170, is routed by local communication unit 172 over connection 173, only if packets that come from remote zones 110*a-c* have the destination address of the MEq 174. Other packets are routed, over connection 175, directly to router 176. Therefore, after the remote MEq 150, the manipulated VPN packet contains the source IP address of VPN unit 134 or 124 and the destination IP address of MEq 174 at the COP 170. Since the destination addresses of the MVPN packet are manipulated by the remote MEq 150 and the addresses of the destination VPN units 192*a-c* are removed, there is a need to correct the manipulated destination addresses before sending the packet to the internet. The correction is done by the MEq 174.

In an alternative embodiment (not shown), MEq 174 receives all the packets that are transferred from local communication unit 172 to router 176. In this embodiment, the manipulated VPN packet, which is traveling over LFN connection 166*a-c*, contains the source IP address of VPN unit 134 and the destination IP address of VPN unit 192*a* at corporate intranet 190*a*. The payload of the manipulated VPN packet, over LFN 166*a-c* is the manipulated original packet that may be encapsulated into an MEq directed tunnel. The source IP address of the MEq tunnel packet may be the private IP address of 132*a*, and the destination address may be the IP addresses of MEq 174 within COP 170. Over the Internet 180 the relevant VPN packet contains the source address of VPN unit 134, and the destination address of the VPN unit 192*a* at the corporate intranet 194*a*. The payload of the VPN packet is the original packet, which has been manipulated and has the same IP addresses as the original packet (132*a*; 196*ak* respectively).

The correction of the destination address of the VPN, in the first exemplary embodiment, is done by using a decentralized table that is located at both MEq modules 150 and 174. Each entry in the decentralized table represent a VPN tunnel between a remote VPN unit 124 or 134 and a corporate VPN unit 192*a-c*. An entry in the decentralized table can be defined by the following three parameters: the IP address of the appropriate remote VPN unit 124 or 134, a manipulated VPN (MVPN) tunnel ID number and the IP address of the appropriate corporate VPN unit 192*a* or 192*c*. The MVPN ID number is a number that represents the IP address of the appropriate corporate VPN unit 192*a-c*. The remote MEq 150 generates the MVPN ID number during the establishment of the connection. In an exemplary embodiment of the present invention the MVPN ID number is encapsulated in the TTL field in the IP header of the manipulated VPN packet as it is described below. Upon setting a connection from a remote client, the decentralized table is updated in both side of the LFN 166*a-c* as it is disclosed below in conjunction with FIG. 4*a*.

During the set up of a new connection from a remote client, 132*a-f* or 122*a-d*, to its corporate intranet 190*a-c*, the appropriate remote MEq 150 establishes a connection with the central MEq 174 over a Manipulated VPN tunnel (MVPN tunnel). The source IP address of the MVPN tunnel packet is the IP address of the appropriate remote VPN (unit 124 or 134), and the destination IP address will be the IP address of MEq 174. In order to represent the appropriate VPN unit on the other side of the Internet, VPN 192*a-c*, which is the destination of the original VPN tunnel, an exemplary embodiment of the present invention may use a portion of the TTL field in the IP header of the MVPN packet to represent the IP address of the original destination VPN unit 192*a-c*. This portion of the TTL field is used later to find the appropriate entry in the decentralized table in order to reconstruct the VPN packet.

In the upload direction, MEq 174 is responsible for correcting the destination address of the VPN packet, as well as the destination address of the payload packet. The correction is based on the decentralized table, which is located at both ends of the LFN connections 166*a-c*, at the MEq 174, and at each one of the remote MEq 150*a-c*. The decentralized table may include among other the following fields: the IP address of the appropriate VPN unit 124 or 134 at the ROZ 110*a-c*, the private IP address and IP port of the remote client 132*a-f* or 122*a-d* at the appropriate ROZ 110*a-c*, the private IP address IP port of the destination 196*aa*-ak or 196*ca*-cm at the corporation's Intranets 194*a-c*, and the MVPN tunnel ID number. The MVPN tunnel ID number is encapsulated in the Time To Live (TTL) field of the IP header of the packet coming over LFN 166*a-c* from the ROZ 110*a-c*.

Since the connection path from remote MEq 150 to the MEq 174 within the COP 170 is defined and unique, the possible number of routers that may be in such a path is limited and known. Therefore, there is no need for the 254 options that exist in the eight bits of the TTL field and the field can be reduced. The exemplary embodiment of the present invention may use the three most significant bits of the TTL field to represent the MVPN tunnel ID number and may use the remaining five bits as a common TTL value. In such an example, remote VPN unit 124 or 134 in ROZ 110*a-c* can communicate simultaneously with up to seven different corporate VPN units 192*a-c*. However, a single VPN tunnel may carry multiple IP connections from multiple remote clients connected on the same remote LAN 130 or 120, to multiple servers over a single Intranet 194*a-c* connection. If there are more than seven connections, the new connections will be transferred without manipulation. During the connection setup, both MEq 150*a-c* and 174 are synchronized. During synchronization, the remote MEq 150 defines the new MVPN tunnel ID number (TTL value) that will represent the IP address of the new corporate VPN unit 192*a-c* and then transfer the new entry to the MEq 174, which updates its decentralized table. When this VPN tunnel is terminated, the remote MEq150 informs the MEq 174 that the connection is terminated and both MEqs delete the appropriate entry in their side of the decentralized table.

Other exemplary embodiments of the present invention may use more or fewer bits than three from the TTL field. The range of the MVPN tunnel ID number can be configured according to the needs of the system.

In the download direction, for example from the corporate intranet 190*a* to remote peer 132*a*, an exemplary TCP/IP original packet may have the following source and destination addresses along its path. Over LAN 194*a* the source address is the private IP address of the local user (e.g. 196*ak*), and the destination address is the private IP address of remote peer 132*a*. Over the Internet 180 the original packet is encapsulated in a VPN packet. The encapsulation was done by VPN unit 192*a*. The VPN packet has the source address of VPN unit 192*a*, and the destination address is the IP address of the VPN unit 134 residing on the remote LAN 130. The payload of the VPN packet is the original packet having the same IP addresses as the original packet (196*ak*; 132*a* respectively).

In order to reduce the load on MEq 174 in the download direction, an exemplary embodiment of the present invention configures the router 176 so that the next HOP of the packets going to VPN units 134 or 124 (which are located at ROZ 110*a-c* and includes remote MEq 150), is MEq 174. In an alternate embodiment of the present invention all the packets going from router 176 to local communication unit 172 are transferred via MEq 174.

In an alternate exemplary embodiment of the present invention the router 176 may be configured, by a system administrator so that the remote VPN units (such as 134 or 124 in ROZ 110*a-c* which include a remote MEq unit 150) are connected directly to an interface (port) of the Router 176, thereby manipulating the router to think that they are local clients. The manipulation may be done by adding the IP subnet/address of the remote VPN unit 124 or 134 to the interface of the router. Therefore the Router 176, upon receiving a packet from the network with an IP destination address of one of the remote VPN units, broadcasts an ARP request to the other side, which includes the MEq 174.

ARP stands for "Address Resolution Protocol" and is an IP protocol used to obtain the physical address of a node. A source station broadcasts an ARP request onto the network with the IP address of a target node, and the target node responds by sending back its physical address to enable the transmission of packets. An ARP request returns the layer 2 address for a layer 3 address. The MEq 174 answers the ARP request. The utilization of the proxy ARP makes the MEq 174 transparent to the network.

Beyond the remote MEq 174, the manipulated VPN packet has the source address of VPN unit 192*a*, and the destination address is the IP address of VPN unit 134 at the ROZ 110. The payload packet of the manipulated VPN packet is the manipulated original packet that may be encapsulated and transferred in a MEq tunnel. The source IP address of the MEq tunnel packet may be the IP address of 196*ak*, and the destination address may be the IP addresses of the MEq 150 at the ROZ 110. Over LAN 140 the relevant VPN packet has the source address of VPN unit 192*a*, and the destination address is the IP address of the VPN unit 134. The payload packet of the VPN packet is the manipulated original packet having the same IP addresses as the original packet, the source IP is the IP address of 196*ak* and the destination is the IP address of 132*a*.

Figure 2A:
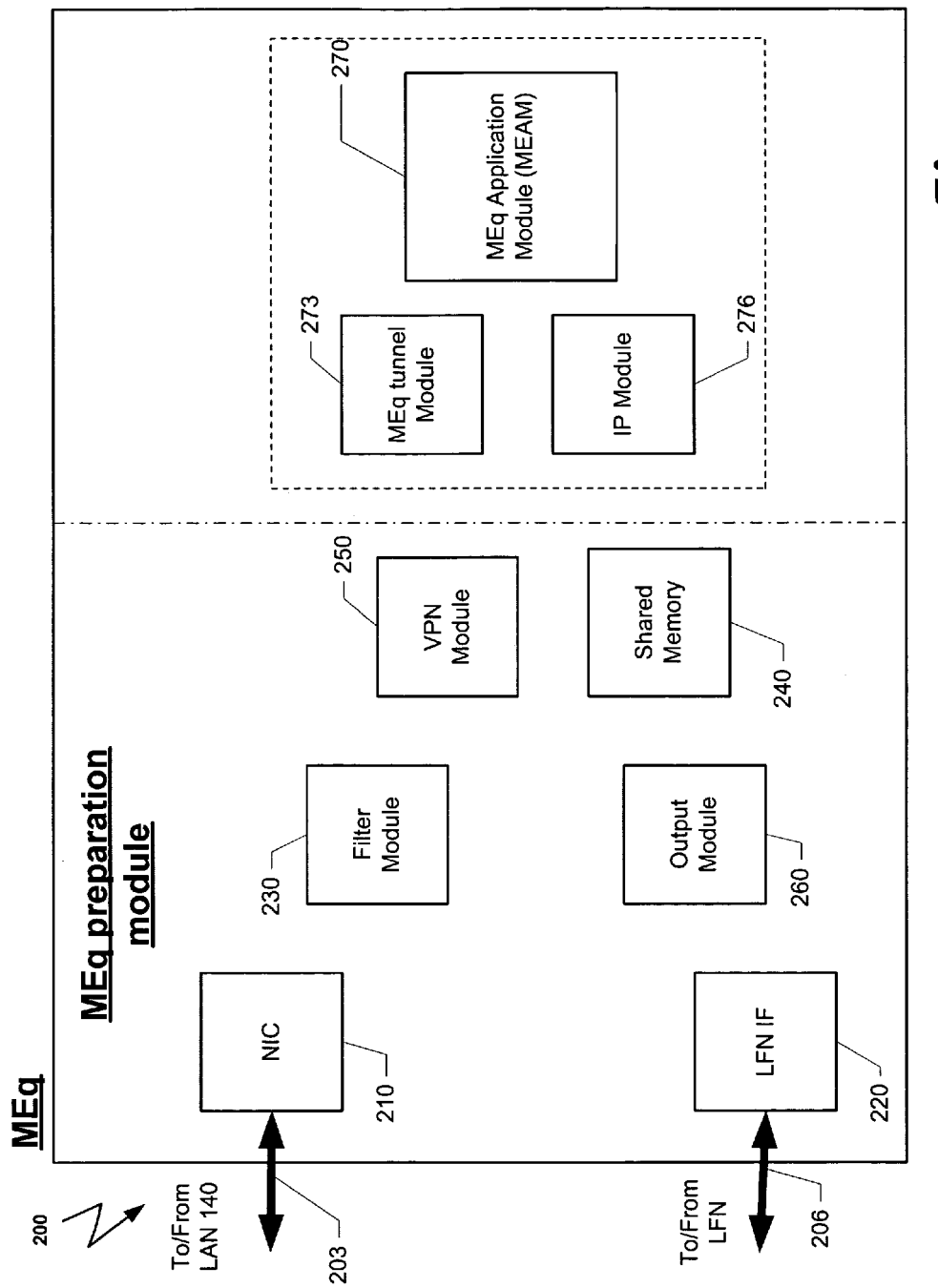
FIG. 2a is a block diagram of an exemplary embodiment of MEq that may be used in a Remote Operator Zone.

FIG. 2a is a block diagram of an exemplary MEq 200 that may be used in a ROZ 110 (FIG. 1). MEq 200 may transmit or receive data traveling to and from the ROZ 110 via connection 203 and transmit or receive data traveling to and from the LFN 166 via connection 206. MEq 200 may be comprised of the following modules: Network Interface Card (NIC) 210; LFN Interface (LFN IF) 220; filter module 230; output module 260; three packets' type modules, VPN module 250, IP module 276, and MEq tunnel module 273; a shared memory 240 and MEq application module (MEAM) 270.

NIC module 210 and LFN IF module 220 are network interface modules that receive incoming data from both networks (LAN 140 and LFN 166 in FIG. 1) via connections 203 and 206 respectively to MEq 200. NIC module 210 and LFN IF module 220 process the incoming data according to their network protocols and translate the information received into packets, which are then transferred to the filter module 230. In the other direction coming from the MEq 200, both modules receive packets from the output module 260, handle the packets according to the network protocol, and then transmit the data over connection 203 or 206 to its destination.

Filter module 230 may receive the incoming packets from both interfaces 210 and 220. The incoming packet will wait for its time to be processed in a queue. Filter module 230 may analyze the packet and may embed metadata into the received packet. The metadata may be used during the next few steps by the different modules. Each module may add metadata as a result of the module processing the packet. This metadata may then be used by subsequent modules that process the packet. The metadata may include information about the packet, such as but not limited to: source address, destination address, type of packet, header size, VPN tunnel ID, MEq tunnel ID, and tunnel characteristics (such as but not limited to checksum, key, sequential number etc.). The information in the metadata may be used while restoring the tunnel. The packet and the metadata are stored in the shared memory 240. Depending on the type of the packet, a pointer to the location of the packet and a pointer to its metadata are transferred to a queue in one of the following modules: output module 260; VPN module 250, IP module 276, MEq tunnel module 273; or MEq application module 270.

In the case where the packet is an IP packet that can be manipulated by the MEq application module 270 (for example a TCP/IP packet) the pointers are stored in the queue of IP module 276. If the packet is a VPN tunnel packet, such as but not limited to a GRE packet, then the pointer is stored in the queue of VPN module 250. In the case where the packet is a MEq tunnel packet, indicating that the packet belongs to an established manipulated connection; the pointer is stored in the queue of MEq tunnel module 273. For packets that cannot be manipulated by MEq 200, the pointer is stored in the queue of the output module 260. In the case where the packet is an IP packet having the destination address of MEq 200, this may be an indication that this packet is a control packet, which may for example, contain a request to start the service of the MEq 200 for a new connection. Therefore, the pointers are transferred to VPN module 250. Such a packet may be sent from one of the remote MEqS, such as MEq 150, in order to establish a new VPN connection between the two MEq units 150a-c and 174 (FIG. 1) that will carry VPN packets. Such a control packet or packets may have information regarding the VPN addresses that are involved in this connection, information about the VPN characteristic, the selected MVPN tunnel ID number that will be embedded in the TTL value and the private IP addresses of both ends of the connection. This information is stored in a new entry in the decentralized table, which may reside in the VPN module 250.

The queue in the VPN module 250 is checked and the packet of the next pointer in the queue is retrieved from the shared memory 240. Then the VPN module 250 parses the VPN packet according to the VPN protocol, such as but not limited to GRE. If the packet is the first packet of a new connection, VPN module 250 may save the tunnel parameters in the decentralized table to be used later on for restoring the tunnel. VPN module 250 assigns the new VPN connection an MVPN ID number. Exemplary tunnel parameters that may be stored in the table include: source and destination addresses, checksum, the protocol type of the payload, the sequential number of its payload (the encapsulated packet), etc. Additional data may then be added to the metadata of this packet. Data regarding the size, in bytes, of the IP header and the VPN header may also be added. Also, a pointer to the appropriate entry in the decentralized table may be added to the metadata.

At both ends of the LFN 166a-c the VPN module 250 may emulate the connection from the far end to the near end in order to manipulate the communication between the two ends and therefore eliminate the need for waiting for an acknowledgment to come from the other end. Therefore, VPN module 250, manages and corrects the sequential number of packets on both sides of LFN 166a-c that are transferred to the near end according to the number that is expected by the near end (e.g. remote VPN unit 124 or 134 for MEq 150 or corporate VPN unit units 192a-c, for MEq 174, for example). Other embodiments of the present invention may emulate additional or other features of the VPN tunnel.

Based on the type of the payload, the VPN module 250 may transfer pointers to the queue in the appropriate module, 276, 273 or 260. This includes pointers that indicate the location in the shared memory 240 of the beginning of the payload (the encapsulated packet) as well as the metadata.

The appropriate module may be MEq tunnel module 273 in the case where the payload is a packet that belongs to a MEq tunnel, or IP module 276 in the case where the payload packet is an IP packet, such as but not limited to TCP/IP. If the payload cannot be manipulated then the pointer is sent to the queue of output module 260.

IP module 276, and MEq tunnel module 273 may be installed in an existing manipulation server that manipulates IP communication. An exemplary manipulation server may be the NettGain server, which is sold by Flash Networks and manipulates TCP/IP and/or UDP/IP communication. Such a manipulated server may be adapted to work in cooperation with the rest of the modules of MEq 200.

The manipulated data, in the direction from MEAM 270, is stored in the shared memory 240 and pointers to the location in the memory of the packet as well as the metadata are transferred to a queue in the appropriate module: IP module 276 in the case where the packet is an IP packet (TCP/IP or UDP/IP) and MEq tunnel module 273 in the case where the packet is an MEq packet. Since the pointers that indicate the packet also indicate the metadata that has been added to this packet upon its entering to the MEq 200, then the appropriate module 273 or 276 may conclude whether the connection, to which the manipulated data is relevant, is a VPN connection or not. If the relevant connection is over a VPN tunnel, then the IP module 276 or MEq tunnel module 273 sends pointers to the queue in the VPN module 250. If the connection is not a VPN connection, then the IP module 276 or MEq tunnel module 273 transfers the pointer to a queue in the output module 260. If the connection is over a VPN then VPN module 250 retrieves the data from the shared memory and based on the metadata and the decentralized table, the VPN module 250 reconstructs the appropriate header that encapsulated the manipulated packet into a VPN packet. The VPN packet is stored in the shared memory and its pointer is transferred to the output module 260.

Output module 260, at the appropriate timing retrieves the next pointer in its queue. Based on this pointer, the output module retrieves the appropriate packet from the shared memory 240 and sends it to it destination via NIC 210 or LFN 220 respectively. More information about the operation of MEq 200 is disclosed below in conjunction with the flowcharts of FIGS. 3, 4a-b, 5, 6, and 7.

FIG. 2b is a block diagram of an alternate exemplary embodiment of MEq 2000 that may be used in a ROZ 110 (FIG. 1). Most of the modules of MEq 2000 are similar to the modules of MEq 200, which are illustrated in FIG. 2a. The difference between the two modules is that more than one MEq Server (MES) 2270a-c may be used instead of the MEAM 270 that is illustrated in FIG. 2a. Instead a MEq IF module 2273 is added to replace the MEq tunnel module 273 and IP module 276. On one side, the MEq IF module 2273 communicates with the filter module 230, output module 260, shared memory 240 and the VPN module 250, MEq IF module 2273 may have an access to the decentralized tables. On the other side, the MEq IF module 2273 is connected over an IP connection 2275 with MES 2270a-c. Packets, which are not transferred over a VPN tunnel either as common IP packets or MEq tunneling packets, upon arriving at MEq 2000 are transferred via NIC 210 or LFN IF 220 through the filter module 230 and the MEq IF module 2273 over connection 2275 on to the MES 2270a-c. If the packet is a VPN packet then it is handled by filter module 230, VPN module 250 and the shared memory 240 in a similar way to the previous example. The operation is similar but with a minor modification. The pointers, which point to the location in the shared memory 240 of the payload of the VPN packet and the metadata, are transferred to a queue in MEq IF 2273. MEq IF 2273 may combine the operations of modules IP module 276 and MEq tunnel module 273.

The main difference between the operation of MEq IF 2273 and IP module 276 and/or MEq tunnel module 273 is that the MEq IF 2273 sends the packet that is encapsulated in the VPN packet as a regular packet over the IP connection 2275 to be manipulated by the MES 2270a-c. While in the embodiment illustrated in FIG. 2a, only the pointer to the location of the payload in the shared memory was transferred, thereby retaining the history of the packet as a metadata in the shared memory. Later upon receiving the pointer to the manipulated packet in the shared memory, the pointers also indicate the metadata. Then the metadata may be used to restore the VPN packet. In the exemplary embodiment 2000, the manipulated packet that returns from MES 2270a-c does not have an indication of the history (metadata) of this packet.

In order to create such a link between the packets that travel to and from the MES 2270a-c over MEq tunnels and the metadata that is stored in the shared memory, MEq IF 2273 creates an index table. An entry to this table is made during the establishment of a new connection with the MES 2270. During this process, MES 2270 sends a MEq tunnel ID to MEq IF Module 2273. The MEq tunnel ID is stored in the index table in the same entry as the pointers that point to the location of the appropriate packet and its metadata in the shared memory. Based on the index table, the MEq IF 2273 may store the manipulated data in the shared memory and send the pointers to the appropriate module. In an embodiment of the present invention the index table may be a section of the decentralized table. The MEq IF 2273 may update the decentralized table with the MEq ID number and synchronized the second copy of the decentralized table that locates in the COP 170 (FIG. 1).

In another exemplary embodiment of the present invention, MEq IF module 2273 may have a pool of fake source or destination port numbers and the decentralized table has a field for storing a selected fake source or destination port number that will represent the new connection. The fake source or destination port number may be arbitrary numbers that are not commonly used over the IP network. When the MEq IF 2273 receives a packet requesting to set a new connection, the MEq IF 2273 may select one of the fake source or destination port number (FPN), saves the selected FPN in a fake source or destination port number filed in the decentralized table in the same entry that is associated with the relevant connection. The decentralized table of the MEq unit on the other side of the LFN is updated accordingly. Then the real destination port is replaced with the FPN and the packet is transferred to the MES 2270a-c in order to start the connection (such as TCP/IP, for example). On the other side of the LFN the FPN is used to point the appropriate entry in the decentralized table in order to replace the FPN with the real one and to re-tunnel the VPN connection as it is disclosed below in conjunction with FIG. 4a step 419.

In another exemplary embodiment (not shown in the drawings) the MEq 150 at the ROZ 110a-c and the MEq 174 at the COP 170 may terminate the VPN connection in their end of the connection and transfer the manipulated data over LFN 166a-c in a private MEq tunnel. At that point, the other end reconstructs the VPN tunnel based on the decentralized table that resides in both of the MEqs, the TTL value and the MEq tunnel ID number. Such an embodiment may use modified system 2000 that is illustrated in FIG. 2b with modifications. The modification may be in MEq IF Module 2273 which is configured to send the manipulated packets returning from MES 2270a-c over IP connection 2275 without encapsulating them into a VPN packet. The manipulated packets are transferred via output module 260, LFN IF 220, over LFN 206, and on to the other MEq.

In such embodiments that are based on modifications of system 2000 (FIG. 2b), the front section 2010 of system 2000 which may be referred to as a MEq preparation module/server may reside in a separate server in front of the MES 2270a-c. The MEq preparation module/server 2010 can be used as an interface between existing MES 2270a-c and LAN 140 and LFN 206 respectively. By using the MEq preparation module/server 2010, existing MES 2270a-c may handle transportation over the VPN.

The MEq 174, at the COP 170 (FIG. 1) may operate in a similar way to the operation of MEq 150 at the ROZ 110 and is disclosed by exemplary embodiments 200 and 2000, which are illustrated in FIGS. 2a-2b. The difference between the two may be in their capacities. MEq 174 may have more capacity than MEq 150 since it handles more connections. Another difference may be in the operation during the set up of a connection, since the connection is initiated and terminated from the client side by MEq 150 with the MEq 174 at the COP responding. An additional difference between the MEq 150 and 174 may be the way in which the packets are routed to those units since the transportation of data to their respective locations is not the same. Usually the transportation in the COP 170 is heavier than in a ROZ 10a-c. Therefore, the remote MEq 150 may receive and check all the packets that are traveling between remote communication unit 160a-c and LAN 140 while the router 176 in COP 170 can be configured to transfer to MEq 174 only packets that are aimed to a ROZ 110a-c having a remote MEq 150. In addition the local communication unit 172 is configured to transfer over connection 173 only packets with the destination address of the MEq 174.

In this application the words "unit" and "module" are used interchangeably. Anything designated as a unit or module may be a stand-alone unit or a specialized module. A unit or a module may be modular or have modular aspects, allowing it to be easily removed and replaced with another similar unit or module. Each unit or module may be any one of, or any combination of, software, hardware, and/or firmware. A module may be a stack of software tasks that perform the functionality of the module.

Figure 3:
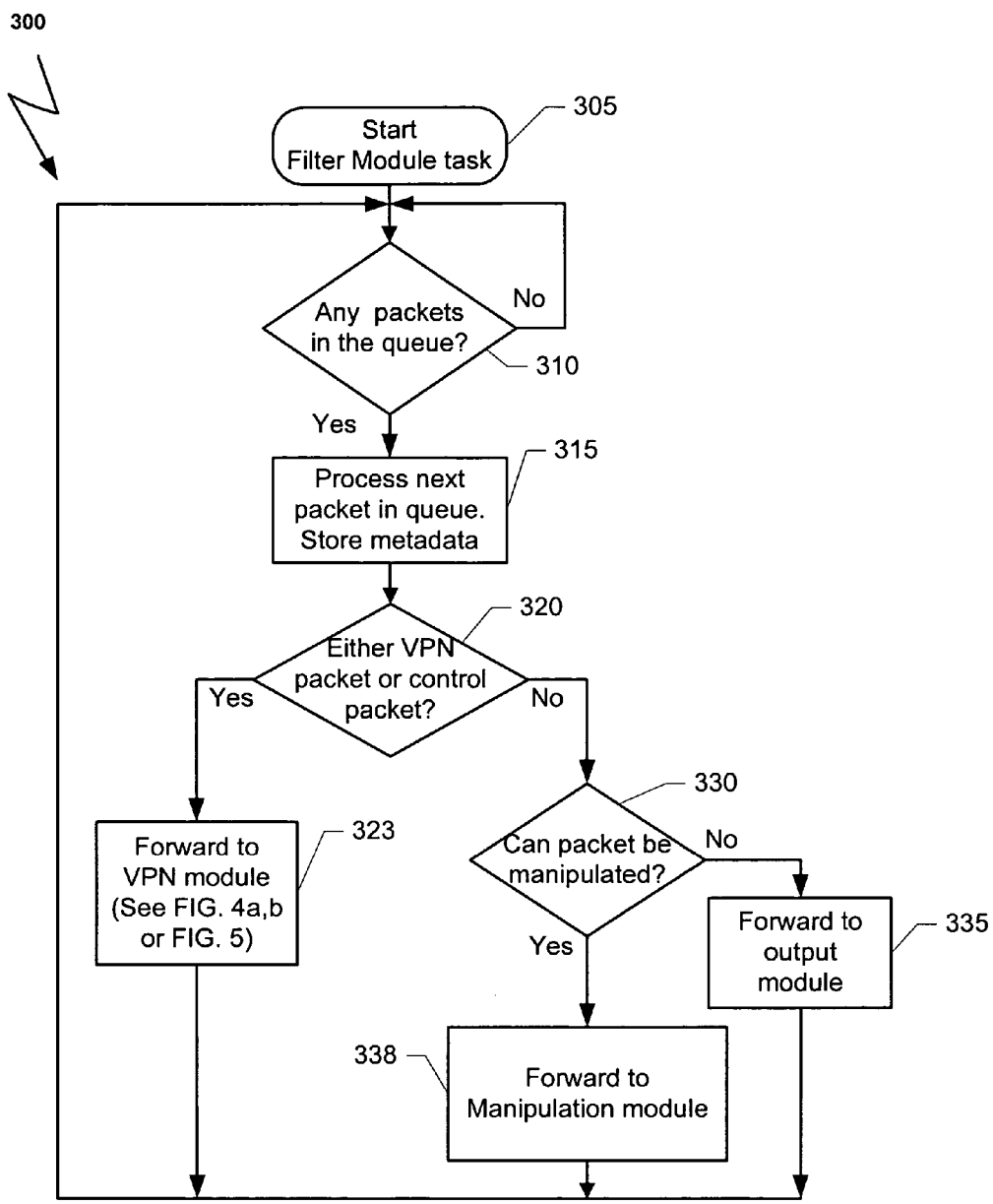
FIG. 3 is a flowchart of an exemplary method that may be used by a filter module.

FIG. 3 is a flowchart of an exemplary method 300 which may be used by a filter module 230 for handling incoming packets from NIC 210 or LFN IF 220 (FIGS. 2a & 2b). After initiation 305, method 300 may run in an infinite loop as long as the MEq 200 is active. At step 310, a queue of the filter module is checked to determine whether a pointer to another packet exists. If it does not, the method waits until a pointer to a new packet arrives. If there is a pointer to a packet in the queue, method 300 proceeds to step 315 and may retrieve the next packet from the shared memory according to the next pointer in the queue.

The packet is processed 315 and information a bout the packet may be attached as metadata to the packet. This information includes but is not limited to: source IP address, destination IP address, direction of the packet (whether it's from the LFN 166a-c (FIG. 1) or to the LFN), type of packet, header size, VPN tunnel ID, MEq tunnel ID, tunnel characteristics (such as checksum, key, and sequential number), the network interface card (NIC 210 or LFN IF 220) that delivered the packet, and a 'toward acceleration' indication. The last two fields may be used during routing of the packet between internal modules of the MEq 200 or 2000, etc. Based on the type of packet a decision is made 320 whether the packet is a VPN packet or control packet. If the packet is either a VPN packet or a control packet, the pointers to the packet and to the associated metadata are sent to a queue in the VPN module 250 (FIGS. 2a & 2b). The operation of VPN module 250 is disclosed below in conjunction with FIGS. 4a-b & 5.

If the packet is neither a VPN packet nor a control packet, then a decision is made on whether 330 the packet may be manipulated by the manipulation equipment. The decision is based on the type of packet. For example, if the existing manipulation equipment manipulates only MEq tunnel packets of existing connections (i.e., TCP/IP and/or UDP/IP packets), then only pointers to those type of packets will be forwarded 338 to a queue of modules (273 or 276 respectively from FIG. 2a), or to module 2273 in the case of the exemplary embodiment 2000 (FIG. 2b).

In the case where the packet cannot be manipulated 330, such as when there is a fragment of the original packet or there are, for example, some UDP/IP packets and the MEq does not handle, then the 'toward acceleration' indication in the metadata is turned off and the pointers to the packet and to its metadata are forwarded 335 to a queue in the outptit module 260 (FIGS. 2a & 2b) and then on to its destination via the appropriate network module 210 or 220. The operation of the output module is disclosed below in conjunction with FIG. 6.

After forwarding 323, 338 or 335 the pointers to the appropriate queue in the appropriate module, the method returns to step 310 for handling the next packet and the loop continues as long as the manipulation equipment is active.

Figure 4A:
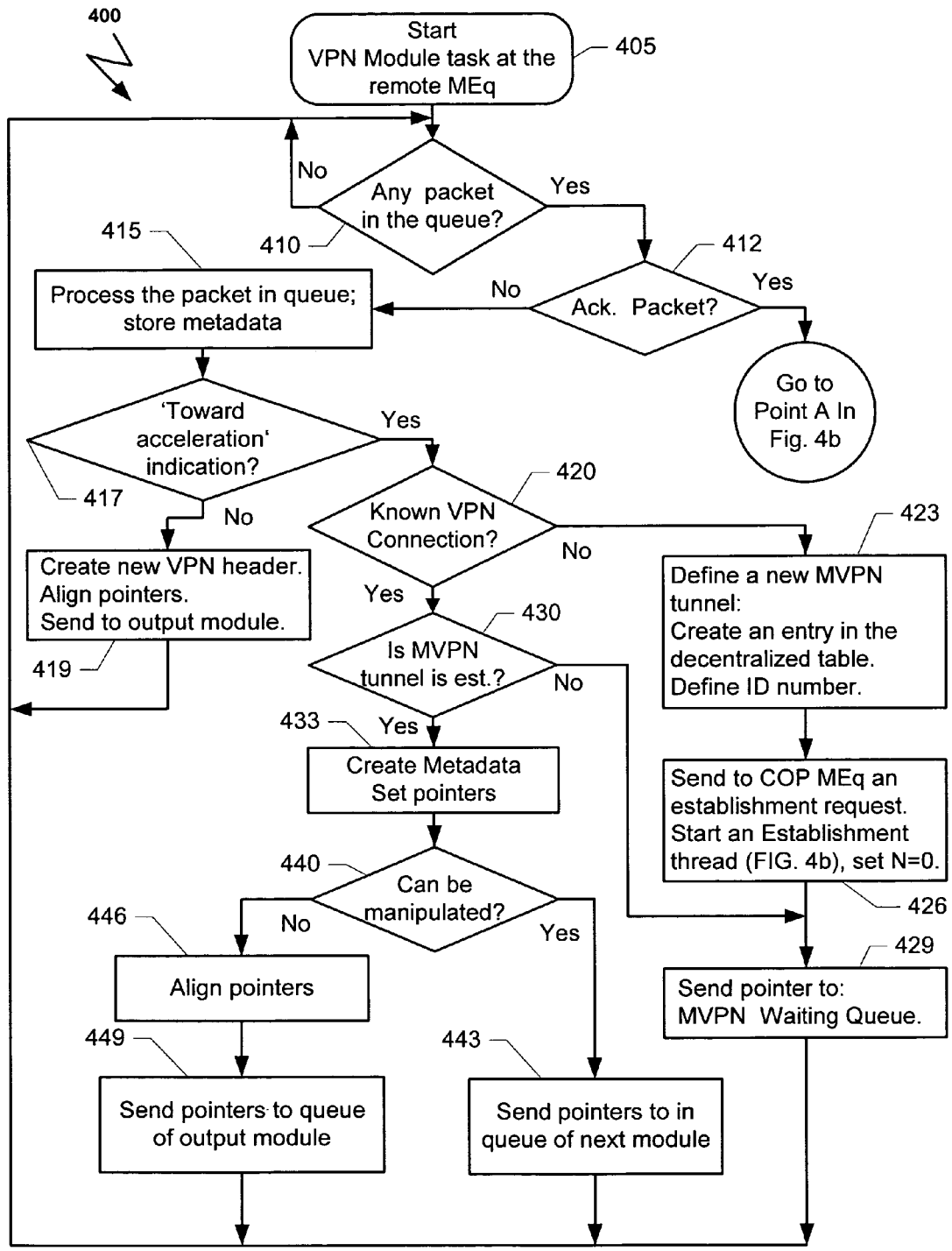
FIG. 4a illustrates a flowchart of an exemplary method that may be used by a VPN module at the remote MEq.
Figure 4B:
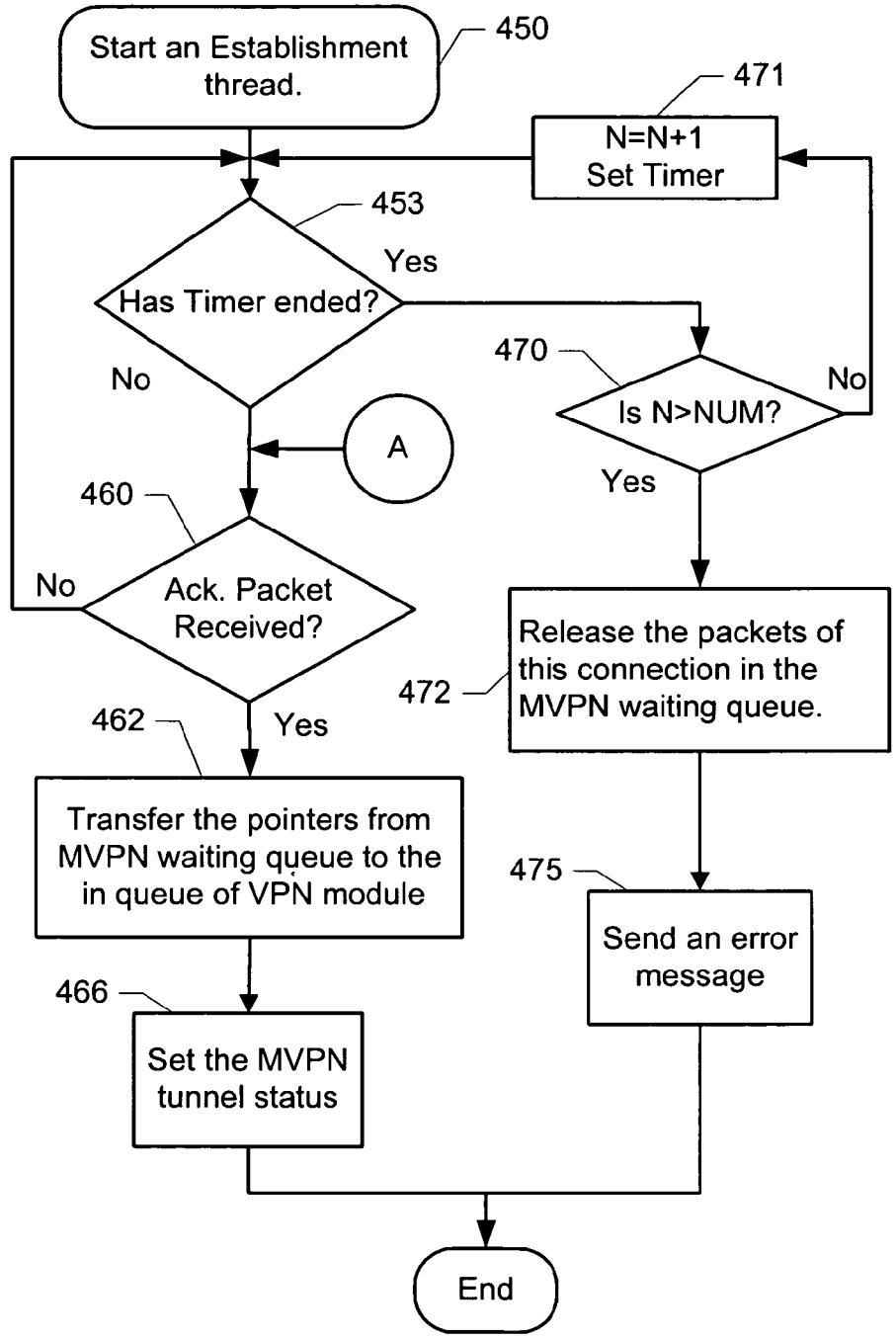
FIG. 4b illustrates a flowchart of an exemplary establishment thread that may be used by a VPN module.

Referring now to FIGS. 4a-b, which illustrate a flowchart of an exemplary method 400 that may be used by VPN module 250 (FIG. 2a), at the remote MEq 150 (FIG. 1), for processing a VPN packet and forwarding it to the appropriate module. After initiation 405, method 400 may run in an infinite loop as long as the MEq 200 is active. At step 410 the queue of the VPN module 250 is checked to determine whether pointers to another packet exist. If not, the method waits until pointers to a new packet arrive. If there is a pointer to a packet in the queue, method 400 proceeds to step 412 and retrieves the packet from the shared memory. It is also determined whether the packet is an acknowledgement packet from MEq 174 at the COP 170. The acknowledgment packet is sent while setting a new connection between the two MEq units 150 and 174. The connection is made over a MVPN tunnel. The MVPN tunnel is the current VPN tunnel where the IP destination address is the IP address of MEq 174 at the COP 170 (FIG. 1) instead of the IP address of the appropriate corporate VPN unit 192a-c. The acknowledgement packet indicates that the two decentralized tables on both the MEq 174 and the remote MEq 150 are synchronized and include an entry for this new connection. If it is an acknowledgment packet, the method 400 proceeds to step 460 (point A in FIG. 4b).

At step 412, if the packet is not an acknowledgment packet, the packet is analyzed at step 415 and information about the packet may be attached as metadata to the packet. This information includes but is not limited to: source IP address, destination IP address of the appropriate VPN units at both ends of the VPN tunnel as well as the private IP addresses of the source and destination of the original packet, type of packet, header size, VPN tunnel ID, MEq tunnel ID, and tunnel characteristic such as checksum, key, sequential number etc.

At step 417, if the 'toward acceleration' indication field in the metadata is on, then VPN Module 250 may search its decentralized table to determine whether the packet belongs to an existing VPN connection at step 429. The search may be based on, but not limited to: the source IP address and the destination IP address of the VPN packet. If at step 420 a respective entry is not found, indicating that this is the first packet of a new VPN tunnel, method 400 proceeds to step 423 and starts a procedure to set a new MVPN tunnel with the other MEq 174 at the COP 170 (FIG. 1).

If at step 420 an entry is found, then method 400 checks to see whether a Manipulated VPN (MVPN) tunnel is established 430. An MVPN tunnel is a VPN tunnel between MEq 150 and MEq 174 having the IP address of MEq 174 and the IP address of the appropriate remote VPN unit, 124 or 134. Furthermore, an MVPN tunnel is dedicated to a single VPN tunnel between certain VPN units. For example, if VPN 134 at ROZ 110b (FIG. 1) currently communicates only with VPN 192a, a single VPN is used. Consequently, a single MVPN is needed.

If a single VPN unit at the ROZ 110a-c communicates with more than one VPN unit 192a-c, more than one MVPN tunnel is needed. For example, if VPN 124 at ROZ 110a communicates simultaneously with VPN units 192b and 192c, two VPN tunnels are needed. Consequently, two MVPN tunnels are also needed. Therefore, the decision at step 430 may be based on the MVPN status in the metadata. This status is set at the end of the establishment process as disclosed below. If an MVPN tunnel is established, then VPN module 250 may generate additional metadata regarding the original packet and set additional pointers indicating the location in the shared memory of different fields in the original packet 433. These fields include addresses, header, payload etc.

At step 430, if an MVPN tunnel has not been established yet, then the relevant pointers of this packet are stored in an MVPN Waiting queue to be retrieved after establishing an appropriate MVPN tunnel 429. At this point the treatment of this VPN packet is ended and method 400 returns to step 410 and searches for the next packet in the queue.

At step 440 a decision is made to determine whether the payload packet of the VPN packet can be manipulated by the manipulation application 270 (FIG. 2*a*) or MEq server 2270*a-c* (FIG. 2*b*). The decision is based on the type of the payload packet. For example, if the type of the payload packet is a TCP/IP packet (in cases where the packet comes from a remote client) or an MEq tunnel type (in cases where the packet comes from COP 170) the payload packet may be manipulated. Therefore at step 443, if the packet can be manipulated, the pointers that are relevant to this packet are sent to a queue in the appropriate module. In the exemplary embodiment of FIG. 2*a*, the appropriate modules are either MEq tunnel module 273 for payload packets that are aligned and sent over a MEq tunnel, or IP module 276 in cases where the payload packet is a TCP/IP packet.

In the exemplary embodiment of FIG. 2*b*, the appropriate module is the MEq IF module 2273 for both types of payload packets. At this point the treatment of this VPN packet ends and method 400 returns to step 410 and searches for pointers to the next packet in the queue. A TCP/IP type of connection is given as an example; however, the present invention is not limited to TCP/IP connections. If other type of packets may be manipulated by the manipulation application, then the present invention may be configured accordingly.

If at step 440 the payload packet cannot be manipulated (for example, the payload packet of the VPN packet is a fragment of a packet) then the pointer is aligned to point to the location of the beginning of the VPN packet in the shared memory 446. The aligned pointer is sent to a queue in the output module 260 at step 449. At this point the treatment of this VPN packet ends and method 400 returns to step 410 and searches for the next packet in the queue.

Returning now to step 420, if the VPN connection is unknown, then method 400 defines a new MVPN tunnel at step 423. A new entry in the decentralized table is established with the IP address of the appropriate remote VPN unit 124 or 134 at the ROZ 110*a-c*, the IP address of the appropriate corporate VPN unit 192*a-c*, and an MVPN tunnel ID number that defines this connection. The MVPN tunnel ID number is required because each remote VPN unit may establish more than one VPN connection with multiple VPN units 192*a-c* simultaneously. The MVPN tunnel ID number is used to define the original destination address and the IP address of the corporate VPN unit 192*a-c* that is replaced by the address of the MEq 174 over the MVPN tunnel. Additional information may be added to the table such as the size of the VPN header, VPN tunnel characteristic parameters, etc.

When the entry is ready, a request to establish a new connection is sent 426 to the MEq 174 at COP 170. The establishment request includes information that was stored before in the appropriate entry in the decentralized table. Information such as, but not limited to the source IP address of the appropriate VPN unit 124 or 134, the appropriate destination IP address 192*a-c* and the MVPN tunnel ID number. In parallel, a new establishment thread is initiated. This thread is described in conjunction with FIG. 4*b*. During initialization, a counter 'N' that is used by this thread is reset and a timer is set. The duration of the timer is longer than the common Round Trip Time (RTT) over the LFN 166*a-c*. The pointers of this MVPN packet are then stored in an MVPN Waiting queue at step 429 to be retrieved after establishing the appropriate MVPN tunnel. At this point the treatment of this VPN packet is ended and method 400 returns to step 410 and searches for the next packet in the queue.

Returning now to step 417, if the 'toward acceleration' indication field in the metadata is turned off, indicating that the packet returned from the acceleration application, then the VPN module creates a new VPN header at step 419 that replaces the original header. The new header describes the new payload packet, which is the manipulated packet that replaces the original payload packet. The new parameters of the header may include a new checksum value, sequential number of the packet, size of the payload packet, etc.

The destination IP addresses of the manipulated VPN packet may be changed as well. The decision is made based on the field in the metadata that indicates which network interface card (NIC 210 or LFN IF 220) delivered the packet. If the packet is coming from NIC 210 (FIGS. 2*a-b*), then the destination IP address of the VPN packet may be replaced. The new destination IP address may be the IP address of MEq 174 (FIG. 1). The TTL value may be replaced as well. The new TTL value may reflect the MVPN tunnel ID number in the decentralized table. This value represents the original destination of the packet, which is the appropriate VPN unit 192*a-c*. If the network interface card that delivered the original packet is LFN IF 220 (FIG. 2*a,b*), then the destination IP addresses may remain as in the original packet, the IP address of VPN unit 134 or 124 at the appropriate ROZ 110*a-c* (FIG. 1).

In the alternate embodiment of the present invention 2000 (FIG. 2*b*) method 400 may be modified in order to process the fake source or destination port number (FPN). In step 419 method 400 may use the FPN for searching the appropriate entry, which is associated with the current packet, in the decentralized table. Then the FPN may be replaced with the real port number, which is written in the associated entry in the decentralized table. Other embodiment of system 2000 may use the index table instead of using the FPN method. The index table is disclosed above in conjunction with FIG. 2*b*.

The pointer is then aligned to point to the VPN header and the pointer is sent to the queue in the output module. At this point the treatment of this VPN packet ends and method 400 returns to step 410 and searches for the next packet in the queue.

In an exemplary embodiment, the manipulation application, in order to accelerate communication, emulates the destination and delivers a "local acknowledgment" instead of waiting for the acknowledgment come from the other side of the LFN 166*a-c*. The MEq module may emulate the VPN unit on the destination side on the other side of the LFN 166*a-c* and calculate a new sequential number step 419 that emulates the expected sequential number.

In an exemplary embodiment in which the VPN protocol is not a connectionless protocol, the VPN module represents and emulates the VPN unit on the other side and generates a VPN acknowledgment packet.

FIG. 4*b* illustrates a flowchart of an exemplary establishment thread that may be used by a VPN module and may run in parallel to handling the VPN packets. The thread 450 is started after sending a request to establish a connection with the MEq 174. The thread 450 is waiting for one of two events—either the end of the timer or acknowledgment received. If the timer has ended 453, then a decision is made on whether 'N' is larger than a certain number of retries "NUM" 470. If 'N' is not larger than "NUM", 'N' is incremented at step 471 by one, the timer is restarted, additional MVPN connection request is sent, and the thread returns to step 453.

If at step 470 'N' is larger than 'NUM', then the pointers in the MVPN Waiting queue and their corresponding packets that belong to this request are discarded at step 472. An error message may be sent to the remote client at step 475, over ROZ 110a-c, indicating that the connection cannot be established, and later the thread is terminated.

If the timer has not expired, then at step 460, during the existence of the thread, if an acknowledgment is received from the other side of the connection from MEq 174, (point A at FIG. 4b), then at step 462 the pointers of this connection in the MVPN Waiting queue, are transferred to the input-queue of the VPN module. These packets will be processed later according to the method that was described above in conjunction with FIG. 4a. The MVPN status is then set at step 466, indicating that the MVPN tunnel is established, and the thread is successfully ended.

Figure 5:
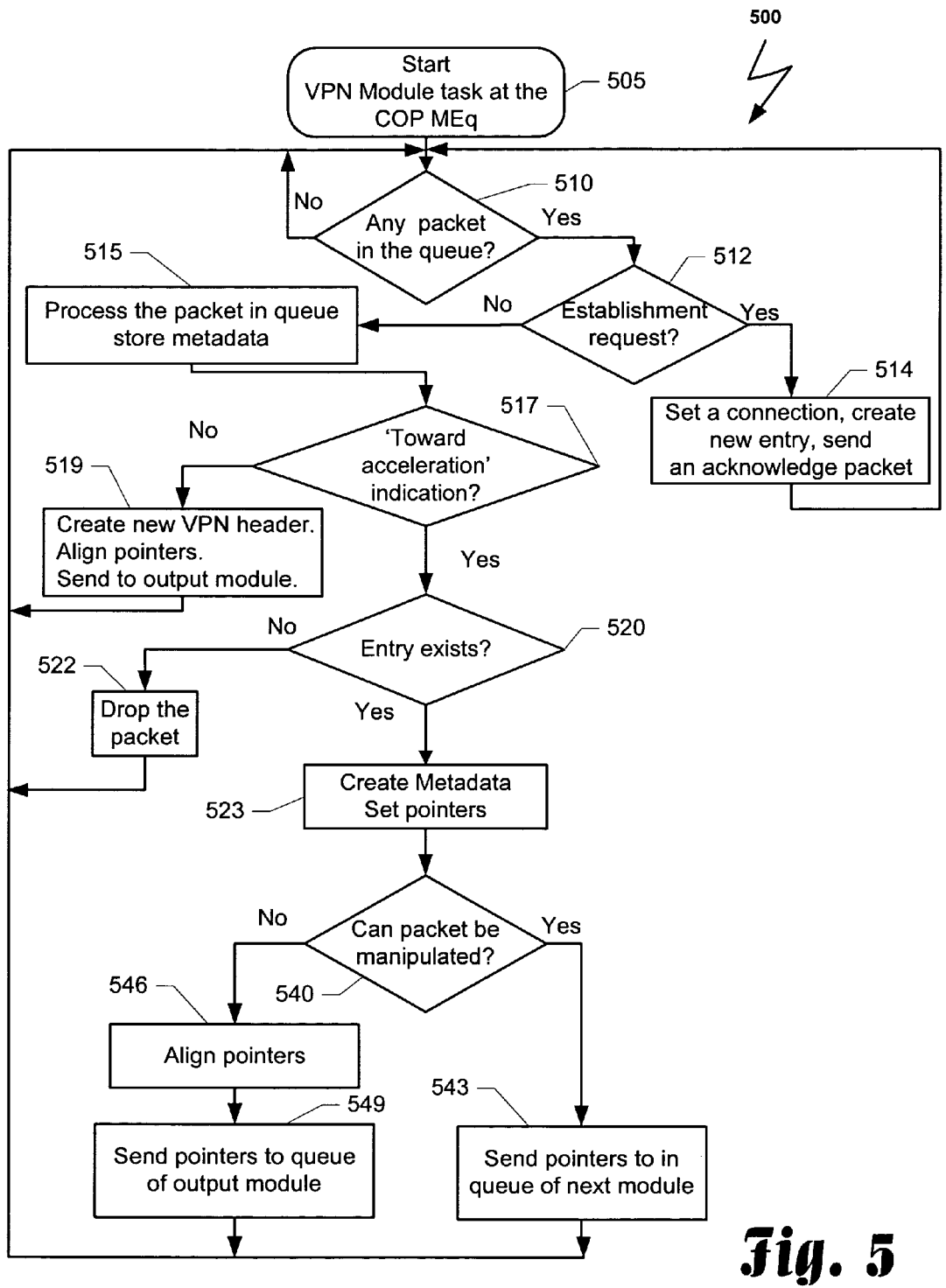
FIG. 5 illustrates a flowchart of an exemplary method that may be used by a VPN module at the MEq in the central operator premises.

FIG. 5 illustrates a flowchart of an exemplary method 500 that may be used by a VPN module at the MEq 174 in the central operator premises 170 (FIG. 1). Among other things, method 500 differs from method 400 in its operation during the establishment of the connection. Because the connection is initiated and terminated by the remote client, method 500 is only responsive to the client's needs.

After initiation 505, method 500 may run in an infinite loop as long as the MEq 200 is active. At step 510 the queue of the VPN module is checked to determine whether pointers to another packet exist. If not, the method waits until pointers to a new packet arrive. If there is a pointer, method 500 proceeds to step 512, retrieves the packet from the shared memory, and determines whether the packet is an establishment request packet from MEq 150 at the ROZ 100a-c. The establishment request packet is sent during the establishment of a new connection (a new MVPN tunnel) between the MEq units 150 & 174, as disclosed in steps 423 and 426 of method 400. Among other parameters, the establishment request packet includes the IP address of the appropriate remote VPN unit 134 or 124 within ROZ 110a-c, the IP address of the destination VPN unit 192a-c at the corporate intranet 190a-c, and the MVPN tunnel ID number that has been selected by method 400 that defines this connection. This MVPN tunnel ID number will be embedded in the TTL field of the following MVPN packets. These parameters of the new connection define the new MVPN tunnel and are used to redirect the VPN packet toward the corporate intranet after manipulation.

If at step 512 the packet is an establishment request packet, then the parameters of the new connection are stored as a new entry in the decentralized table of the MEq 174. Then an acknowledgment packet 514 is sent in response to MEq 150. The acknowledgment packet indicates that the two decentralized tables on both of the MEqs are synchronized and includes an entry for this new tunnel. Processing then returns to step 510 to determine if another packet is in the queue.

If at step 512 the packet is not an establishment request packet, then the packet is processed at step 515 and information about the packet may be attached as metadata to the packet. This includes information such as, but not limited to: source IP address, destination IP address of the appropriate VPN units at both ends of the VPN tunnel as well as the private IP addresses of the source and destination of the original packet, type of packet, header size, VPN tunnel ID, the TTL value that represents the MEq tunnel ID in the decentralized table, and VPN tunnel characteristics such as checksum, key, sequential number etc. Based on the attached metadata, a decision is made at step 517 to determine whether the packet is going toward the acceleration application. The decision is based on the 'toward acceleration' indication field in the metadata that is set by the filter module 230 (FIGS. 2a-b).

If the packet is going towards the acceleration application, then at step 520 a decision is made regarding whether the Manipulated VPN (MVPN) tunnel of this connection has an entry in the decentralized table. Searching the entry at step 520 is based on the source IP address of the VPN packet that indicates the appropriate remote VPN unit 134 or 124 and the TTL value that indicates the MVPN tunnel ID. Or in the case of a packet that comes from the corporation side, the search performed by searching the IP addresses of both VPN units. If an entry is found, then at step 523 the VPN module may generate additional metadata regarding the original packet and set additional pointers indicating the location in the shared memory of different fields in the original packet. This includes fields such as addresses, header, payload etc.

If at step 520 no entry has been found in the decentralized table, indicating that a MVPN tunnel is not set, then the relevant pointers of this packet are deleted and the packet is dropped at step 522. Other embodiment of the present invention may transfer the packet as is to its destination via the output module 260 (FIG. 2). At this point the treatment of this VPN packet is ended and method 500 returns to step 510 and searches for the next packet in the queue.

At step 540 a decision is made regarding whether the payload packet of the VPN packet can be manipulated by the manipulation application or MEq server. The decision is based on the type of the payload packet. For example, if the type of the payload packet is a TCP/IP packet (in the case where the packet comes from a corporate intranet 194a-c) or MEq tunnel type (in the case where the packet comes from ROZ 110a-c) the payload packet may be manipulated. Therefore at step 543, the pointers that are relevant to this payload packet are aligned and sent to a queue in the appropriate module. In an exemplary embodiment the appropriate modules are either the MEq tunnel module for payload packets that travel over a MEq tunnel, or the IP module in the case where the payload packet is a TCP/IP packet.

In an alternate exemplary embodiment the appropriate module is the MEq IF module for both types of payload packets. At this point the treatment of this VPN packet ends and method 500 returns to step 510 and searches for the next packet in the queue. However, the present invention is not limited to TCP/IP type of packets. In another exemplary embodiment, if the MEq application or MEq server manipulates another type of packet, such as but not limited to UDP/IP packets, the present invention may be configured accordingly and handles UDP/IP packets as well.

If at step 540 the payload packet cannot be manipulated— for example the payload packet of the VPN packet is a fragment of a packet, then the pointer is aligned at step 546 to point to the location of the beginning of the VPN packet in the shared memory. The 'toward acceleration' indication field in the metadata is turned off and the aligned pointer is sent 549 to a queue in the output module. At this point the treatment of this VPN packet ends and method 500 returns to step 510 and searches for the next packet in the queue.

Returning now to step 517, if the 'toward acceleration' indication field in the metadata is turned off (which indicates that the packet returned from the acceleration application) then the VPN module creates 519 a new VPN header that replaces the original header. The new header describes the new payload packet—the manipulated one that replaces the original payload packet. The new parameters of the header may include a new checksum value, sequential number of the packet, size of the payload packet, etc.

The destination IP addresses of the manipulated VPN packet may be changed too. The decision is made based on the field in the metadata that indicates which network interface card (NIC 210 or LFN IF 220) delivered the packet. If the packet is coming from LFN IF 220 (FIGS. 2a-b), then the destination IP address of the VPN packet may be replaced. The new destination IP address may be the IP address of the appropriate VPN unit 192*a-c* (FIG. 1). The appropriate new destination IP address is retrieved from the appropriate entry in the decentralized table. The entry may be found based on the TTL value of the arrived VPN packet and the source IP address of the appropriate remote VPN unit 124 or 134 (FIG. 1). If the network interface card that delivered the original packet is NIC 210 (FIG. 2*a,b*), then the destination IP addresses may remain as in the original VPN packet, the IP address of VPN unit 134 or 124 at the appropriate ROZ 100*a-c* (FIG. 1).

The pointer is then aligned to point the VPN header and the pointer is sent to the queue in the output module. At this point the treatment of this VPN packet ends and method 500 returns to step 510 and searches for the next packet in the queue.

In exemplary embodiments the manipulation application, in order to accelerate the communication, emulates the destination and delivers a 'local acknowledgment' instead of waiting for the acknowledgment to come from the other side of the LFN 166*a-c*. The MEq module may emulate the VPN unit on the destination side, on the other side of the LFN 166*a-c*. For example, it may calculate a new sequential number that emulates the expected sequential number; calculate the new checksum parameter key, etc.

In an exemplary embodiment in which the VPN protocol is not a connectionless protocol, the VPN module represents the other side VPN unit and generates a VPN acknowledgment packets.

Figure 6:
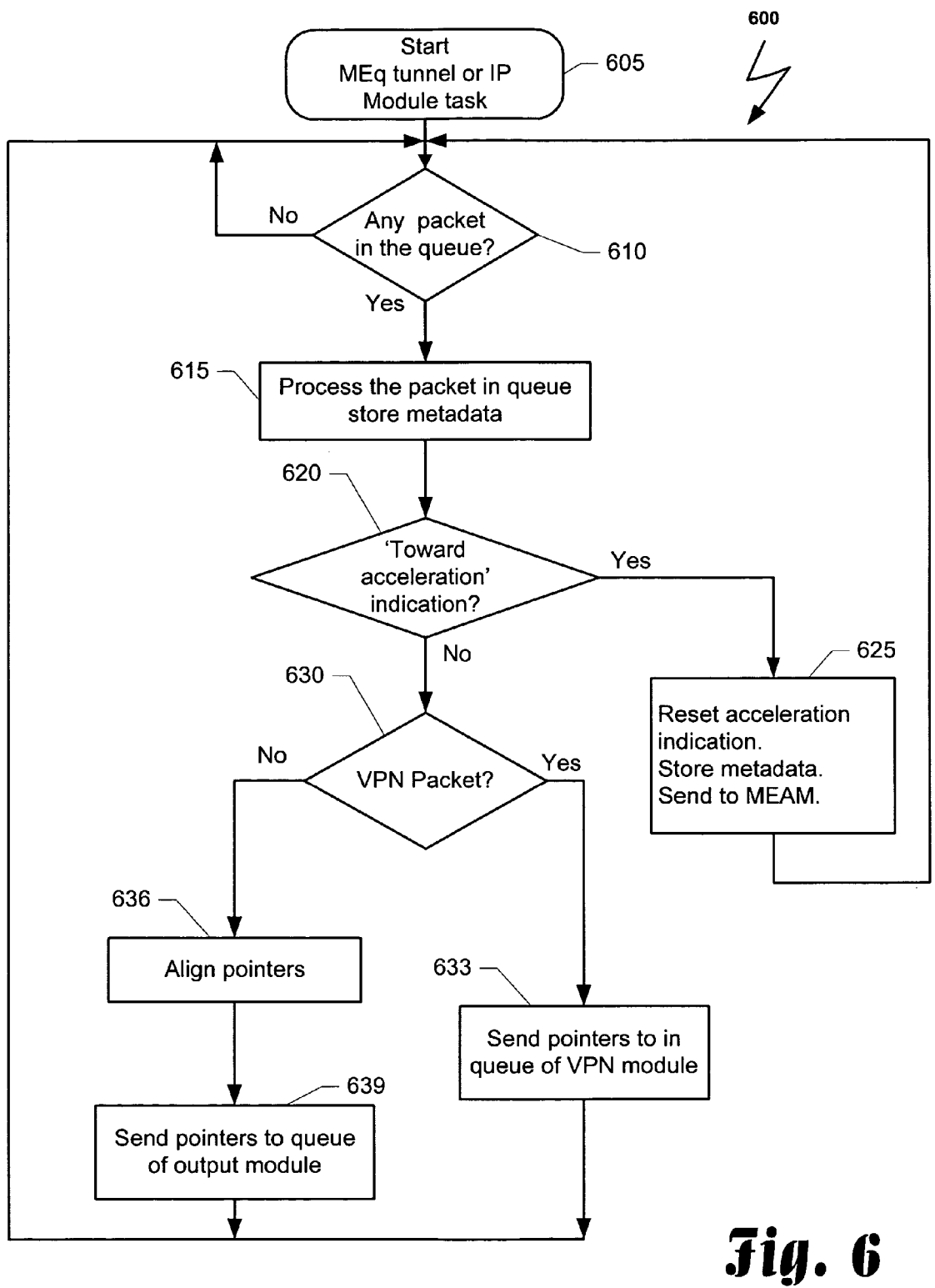
FIG. 6 illustrates a flowchart of an exemplary method that may be used by a MEq tunnel module or IP module in the Central Operator Premises.

FIG. 6 illustrates a flowchart of an exemplary method 600 that may be used by a MEq tunnel module 273 or IP module 276 (FIG. 2*a*) at the MEq 174 in the central operator premises 170 (FIG. 1) or MEq 150 at the ROZ 110*a-c*. With a small modification, method 600 may also disclose the operation of MEq IF module 2273 in FIG. 2*b*.

After initiation 605, method 600 may run in an infinite loop as long as the MEq 200, or 2000 is active. At step 610 the queue of the VPN module is checked looking for pointers to the next packet. If the pointers do not exist, the method waits until pointers to a new packet arrive. If the pointers do exist, method 600 proceeds to step 615 and retrieves the packet from the shared memory. The packet is then analyzed and information about the packet may be attached as metadata to the packet. This includes information that is relevant to the communication with the manipulation application, such as but not limited to a ID number of a manipulation tunnel that may carry the manipulation packet that associates it with the original packet.

Based on the attached metadata a decision is made 620 on whether the packet is going towards the acceleration application. The decision is based on the 'toward acceleration' indication field in the metadata that is set by the filter module 230 (FIG. 2*a,b*). If the packet is going toward the acceleration application, then at step 625 the 'toward acceleration' indication field in the metadata is reset. The metadata is stored in the shared memory; the pointer is aligned to point to the payload packet and the metadata. Then the pointer are sent to the MEAM 270 (FIG. 2*a*). At this point the treatment of this VPN packet ends and method 600 returns to step 610 and searches for the next packet in the queue.

If at step 620 the packet is coming from the MEq application (i.e., the 'toward acceleration' indicator is not set), then a decision is made at step 630 regarding whether the original packet was a payload packet of a VPN packet. The decision is based on the metadata that is associated with this packet. If the packet is a VPN packet, then the pointer is aligned at step 633 to point to the beginning of this packet and the pointer is sent to the queue in the VPN module 250 (FIGS. 2*a-b*). At this point, the treatment of this VPN packet ends and method 600 returns to step 610 and searches for the next packet in the queue.

If at step 630 the original packet was not encapsulated in a VPN packet, then the pointer is aligned at step 636 to point to the beginning of this packet and at step 639 the pointer is sent to the queue in the output module 250 (FIG. 2*a-b*). At this point the treatment of this VPN packet ends and method 600 returns to step 610 and searches for the next packet in the queue.

In an alternate embodiment 2000 (FIG. 2*b*), a MES 2270*a-c* is used. MEq IF module 2273 replaces the two modules 273 and 276 in the embodiment 200 (FIG. 2*a*). In the alternate embodiment, the metadata is not transferred to the MES 2270*a-c*. The operation of MEq IF module 2273 may be disclosed by method 600 with minor adaptations. To overcome the obstacle that the metadata is not shared with the MES 2270*a-c*, MEq IF module 2273 generates the index table, as it is disclosed above in conjunction of FIG. 2*b*. Therefore after step 620, if the direction is toward the MES 2270, the metadata is stored in the shared memory, based on the metadata and the index table. MEq IF module 2273 sets a connection (such as TCP/IP) with the MES 2270 and sends the entire payload packet over IP connection 2275 to MES 2270 instead of only sending the pointers. In some embodiments of the present invention the index table may be a part of the decentralized table.

If at step 620 the direction is from the MES 2270, then based on the connection parameters with the MES 2270 the MEq IF module 2273 search for the appropriate entry in the index table and from there it retrieves the appropriate location in the shared memory that belongs to this connection. Then the manipulated packet that comes from 2270*a-c* is stored in the location of the payload packet in the shared memory and the method proceeds to step 630.

In the alternate embodiment of the present invention, in which a fake source or destination port number (FPN) is used, step 625 may be modified and the following steps may be added to it. If the packet belongs to a new connection (such as TCP/IP, for example), then a FPN is selected and be stored in the decentralized table in the appropriate field. The decentralized table of the other MEq is synchronized. Then the real destination port number is replaced and the packet with the fake destination address is transferred to the MES 2270 (FIG. 2*b*).

In the FPN embodiment of the present invention, if at step 620 the direction is from the MES 2270, the MEq IF module 2273 uses the FPN to search for the appropriate entry in the decentralized table and from there it retrieves the appropriate location in the shared memory that belongs to this connection. Then the manipulated packet that comes from MES 2270*a-c* is stored in the location that is associated with the payload packet in the shared memory and the method proceeds to step 630. Other exemplary embodiment may use other fields in the IP header instead of the destination port.

Figure 7:
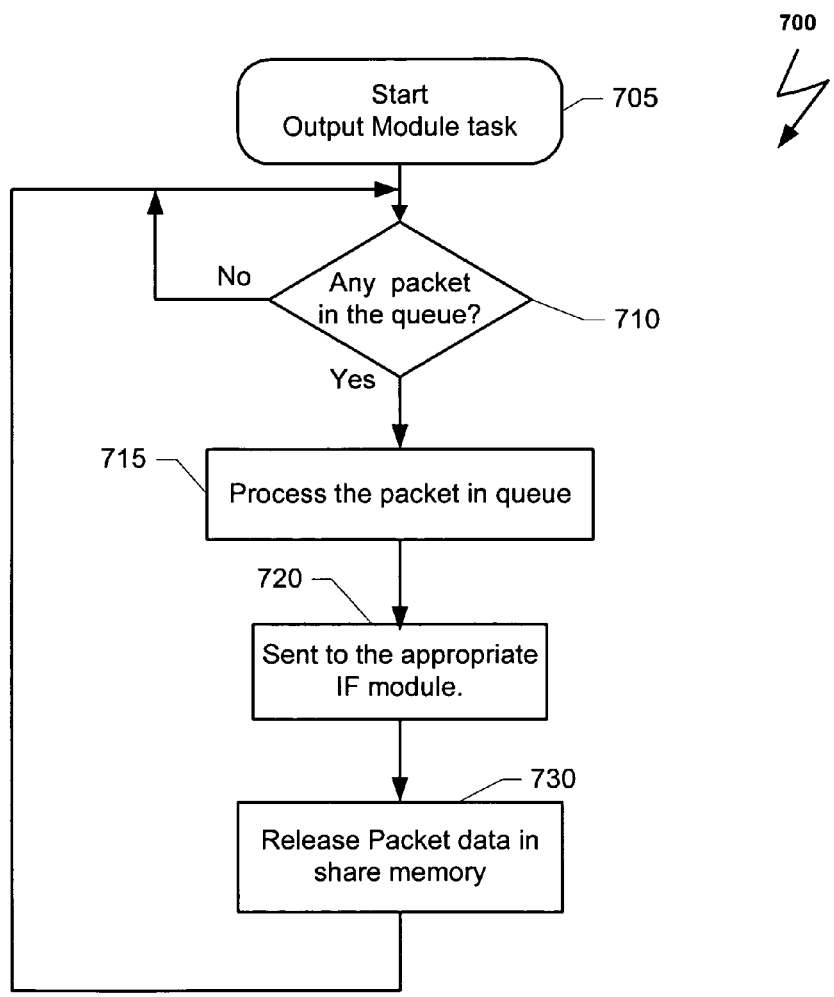
FIG. 7 illustrates a flowchart of an exemplary method that may be used by an output module.

FIG. 7 illustrates a flowchart of an exemplary method 700 that may be used by an output module 260 (FIGS. 2*a-b*). After initialization 705, method 700 may run in an infinite loop as long as the MEq 200, or 2000 is active. At step 710 the queue of the VPN module is checked to determine whether pointers to the next packet exist. If the pointers do not exist, the method waits until pointers to a new packet arrive. If pointers do exist, method 700 proceeds to step 715 and retrieves the packet from the shared memory. The packet is then analyzed and based on the metadata (for example, based on the field that indicates which network interface card (NIC 210 or LFN IF 220) delivered the packet) a decision is made regarding which interface card (NIC 210 or LFN IF 220) to use in sending the packet. The packet is then sent 720 to the other interface card rather than the interface card that has delivered the packet.

At step 730 the data in the shared memory that belongs to this packet is deleted, and the pointers relevant to this packet are released. At this point the treatment of this packet in the MEq 150 or 174 (FIG. 1) ends and method 700 returns to step 710 and searches for the next packet in the queue.

Overall, aspects of the present invention will improve the communication conducted over networks including but not limited to Long Fat Networks involving VPNs between remote peers and their corporate intranet. The present invention reduces the overall duration of such a connection by manipulating the payload packet that is encapsulated in a VPN packet. Furthermore the present invention discloses a method and an apparatus that enables the utilization of existing manipulation servers or applications that may manipulate common IP transportation but disregards VPN packets. Exemplary embodiments of the present invention may prepare the transportation over a VPN to be ready for manipulation by the MEq. The preparation may be done by peeling the envelop of the VPN packet and delivering the payload packet to the existing manipulation server or application and improving its capabilities.

In the description and claims of the present application, each of the verbs, "comprise" "include" and "have", and conjugates thereof, are used to indicate that the object or objects of the verb are not necessarily a complete listing of members, components, elements, or parts of the subject or subjects of the verb.

The present invention may be established by any one of, or any combination of, software, hardware, and/or firmware.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

What is claimed is:

1. A communication system for facilitating communication with a remote client over an IP network, wherein at least a portion of the IP network includes a specific network segment, the communication system comprising:
   a central operator premises that includes:
   a local communication unit; and
   a local manipulator having a second copy of a decentralized table;
   a remote operator zone that includes:
   a remote communication unit, the remote communication unit being communicatively coupled to the local communication unit through the specific network segment; and
   a remote manipulator having a first copy of the decentralized table;
   a corporate local area networks;
   the communication system being operable to manage a VPN tunnel between the remote client communicatively coupled to a remote VPN unit and a corporate client communicatively coupled to a corporate VPN unit through the central operator and the remote operator zone by:
   receiving a first packet of a new VPN connection from the remote VPN at the remote manipulator;
   creating a decentralized table entry with an identifier that is associated with the source and destination IP addresses of the VPN packet and synchronizing the second copy of the decentralized table at the local manipulator;
   modifying the destination IP address of the packet to be the IP address associated with the local manipulator;
   receiving a packet, at the central operator premises, from the remote manipulator, the packet including data to identify an appropriate entry in the decentralized table; and
   modifying the destination address of the packet to be the IP address according to the data in the identified entry at the second copy of the decentralized table.

2. The communication system of claim 1, wherein the remote manipulator is operable to emulate the corporate VPN unit in communicating with the remote VPN unit.

3. The communication system of claim 2, wherein the remote manipulator manages the sequence number of VPN packets received and transmitted.

4. The communication system of claim 1, wherein the local manipulator is operable to emulate the remote VPN unit in communicating with the local VPN unit.

5. The communication system of claim 4, wherein the local manipulator manages the sequence number of VPN packets received and transmitted.

6. The communication system of claim 1, wherein data to identify the entry in the decentralized table is embedded within the time-to-live field of the IP header of the VPN packet.

7. The communication system of claim 1, wherein data to identify the entry in the decentralized table is the IP destination and/or source addresses of the VPN packet.

8. The communication system of claim 1, wherein the specific network segment is a network segment selected from the group consisting of wireless, satellite, cellular, and fiber optics.

9. The communication system of claim 1, wherein an entry in the decentralized table is identified by a second identifier that is embedded in a field of the IP header of a payload packet that is transferred over the VPN connection.

10. The communication system of claim 9, wherein the second identifier is a fake source or destination port number that replaces the original source or destination port number.

11. A method for facilitating communication between a remote client and a corporate intranet interfacing to an IP network, wherein at least a portion of the communication is conducted over a specific network segment, the specific network segment having a first end interfacing to a remote operator zone that includes a LAN and a remote manipulator having a first copy of a decentralized table and a second end interfacing to a central operator, the central operator bridging the second end of the specific network segment to the IP network through a local manipulator having a second copy of the decentralized table, the method comprising the steps of:
   receiving a VPN packet at the remote operator zone from a VPN unit through the LAN, the packet including a VPN source address and a VPN destination address;
   creating a decentralized table entry with an identifier that is associated with the VPN source address and the VPN destination address contained in the packet and synchronizing the second copy of the decentralized table at the local manipulator;

modifying the destination VPN address of the packet to be the network address of the local manipulator;

transmitting the modified packet over the specific network segment to the local operator zone along with the decentralized table entry identifier;

receiving the modified packet and the decentralized table entry identifier;

reverting the destination address of the modified VPN packet to its original value based on the decentralized table entry identifier; and delivering the VPN packet to its destination over the network.

12. The method of claim 11, wherein the VPN packet includes a payload packet that includes at least one private IP address as either a source or destination.

13. The method of claim 11, further comprising the step of synchronizing the decentralized table at the local operator with a decentralized table at the remote operator zone.

14. The method of claim 11, wherein the step of transmitting the modified packet over the specific network segment to the local operator zone along with the decentralized table entry identifier further comprises embedding the decentralized table entry identifier into the time to live (TTL) field of the packet.

15. The method of claim 12, further comprising the step of modifying the payload packet prior to transmitting the modified packet over the specific network segment.

16. A method for facilitating communication between a remote client and a corporate intranet interfacing to an IP network, wherein at least a portion of the communication is conducted over a specific network segment, the specific network segment having a first end interfacing to a remote operator zone that includes a local area network and a remote manipulator and a second end interfacing to a central operator, the central operator bridging the second end of the specific network segment to the IP network through a local manipulator, the method comprising the steps of:

receiving a packet from a remote VPN unit through the local area network, the packet including a source address and a destination address;

creating a decentralized table entry with an identifier that is associated with the source address and destination address contained in the packet;

modifying the destination address of the packet to be the network address of the local manipulator;

transmitting the modified packet over the specific network segment to the central operator along with the decentralized table entry identifier;

receiving the modified packet and the decentralized table entry identifier;

reverting the destination identifier of the modified packet to its original value based on the decentralized table entry identifier; and delivering the packet to its destination over the IP network.

17. The method of claim 16, wherein the VPN packet has a payload that includes at least one private IP address as either a source or destination.

18. The method of claim 16, further comprising the step of synchronizing a copy of the decentralized table at the local operator with the decentralized table at the remote operator zone.

19. The method of claim 17, further comprising the step of modifying the payload packet at remote manipulator prior to transmitting the modified packet over the specific network segment.

20. The method of claim 17, wherein an entry in the decentralized table is identified by a second identifier that is embedded in a field of the IP header of a payload.

21. The method of claim 20, wherein the second identifier is a fake source or destination port number that replaces the original source or destination port number in the IP header of a payload.

22. A communication system for connecting at least one remote client with a destination over the Internet via a VPN tunnel, wherein at least a segment of the VPN tunnel is done over a specific network segment, the communication system comprising:

an IP based network;

at least one corporate network connected via a VPN unit to the IP network, each corporate network being associated with a corporate organization;

a specific network segment;

at least one remote operator zone, wherein the remote operator zone comprises at least one remote network of said corporate organization having at least one remote client of the corporate organization; a remote operator network; a remote manipulation equipment; and a remote communication unit, wherein the at least one remote network of said corporate organization is connected to a VPN unit, the VPN unit being communicatively coupled over said remote operator network to the remote manipulation equipment, the remote manipulation equipment is communicatively coupled to the specific network segment through the remote communication unit; and a central operator zone, wherein the central operator zone comprises a local communication unit communicatively coupled to the specific network segment and local manipulation equipment, the local manipulation equipment is communicatively coupled to the IP based network through a router;

wherein communication between the at least one remote client and a destination in the at least one corporate network is conducted through a VPN tunnel and wherein the remote manipulation equipment and the local manipulation equipment are adapted to manipulate the payload of the VPN packets, wherein each one of the remote manipulation equipment and the local manipulation equipment are adapted to break the VPN tunnel, manipulate the payload, transfer the manipulated payload over the specific network segment to the other manipulation equipment, and the other manipulation equipment is adapted to reconstruct the VPN tunnel and send the reconstructed VPN packet to its destination and, wherein information regarding the VPN tunnel is transferred between the local manipulation equipment and the remote manipulation equipment in one of the fields of the IP header of the packets that carries the manipulated payload over the specific network segment.

23. The communication system of claim 22, wherein the field of the IP header is the time to live (TTL) field.

24. A communication system for connecting at least one remote client with a destination over the Internet via a VPN tunnel, wherein at least a segment of the VPN tunnel is done over a specific network segment, the communication system comprising:

an IP based network;

at least one corporate network connected via a VPN unit to the IP network, each corporate network being associated with a corporate organization;

a specific network segment;

at least one remote operator zone, wherein the remote operator zone comprises at least one remote network of said corporate organization having at least one remote client of the corporate organization; a remote operator network: a remote manipulation equipment; and a remote communication unit, wherein the at least one remote network of said corporate organization is connected to a VPN unit, the VPN unit being communicatively coupled over said remote operator network to the remote manipulation equipment, the remote manipulation equipment is communicatively coupled to the specific network segment through the remote communication unit; and a central operator zone, wherein the central operator zone comprises a local communication unit communicatively coupled to the specific network segment and local manipulation equipment, the local manipulation equipment is communicatively coupled to the IP based network through a router;

wherein communication between the at least one remote client and a destination in the at least one corporate network is conducted through a VPN tunnel and wherein the remote manipulation equipment and the local manipulation equipment are adapted to manipulate the payload of the VPN packets, wherein each one of the remote manipulation equipment and the local manipulation equipment are adapted to break the VPN tunnel, manipulate the payload, transfer the manipulated payload over the specific network segment to the other manipulation equipment, and the other manipulation equipment is adapted to reconstruct the VPN tunnel and send the reconstructed VPN packet to its destination and, wherein a field in the IP header of the payload packet is manipulated in order to identify an entry in the decentralized table that is associated with the connection of the at least one remote client and the destination in the at least one corporate network.

25. The communication system of claim 24, wherein the field in the IP header of the payload packet is the source or destination port number.

* * * * *